US009912434B2

(12) United States Patent
Cao

(10) Patent No.: US 9,912,434 B2
(45) Date of Patent: Mar. 6, 2018

(54) SERVICE TRANSMISSION METHOD IN AN OPTICAL TRANSPORT NETWORK AND DEVICE AND SYSTEM FOR IMPLEMENTING THE METHOD

(71) Applicant: Huawei Technologies Co., Ltd., Shenzhen (CN)

(72) Inventor: Shiyi Cao, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 1084 days.

(21) Appl. No.: 13/847,329

(22) Filed: Mar. 19, 2013

(65) Prior Publication Data

US 2013/0215898 A1 Aug. 22, 2013

Related U.S. Application Data

(63) Continuation of application No. PCT/CN2011/083643, filed on Dec. 7, 2011.

(51) Int. Cl.
H04L 12/66 (2006.01)
H04J 14/02 (2006.01)
(Continued)

(52) U.S. Cl.
CPC ........ H04J 14/0227 (2013.01); H04J 3/1652 (2013.01); H04L 49/357 (2013.01);
(Continued)

(58) Field of Classification Search
CPC ........ H04J 3/161; H04L 49/602; H04L 45/04; H04L 45/50
See application file for complete search history.

(56) References Cited

U.S. PATENT DOCUMENTS 6,985,488 B2 * 1/2006 Pan ............... H04J 3/1617
370/395.3
7,068,663 B1 6/2006 Adler
(Continued)

FOREIGN PATENT DOCUMENTS

CN 1757210 A 4/2006
CN 101729384 A 6/2010
(Continued)

OTHER PUBLICATIONS

International Search Report issued in corresponding PCT Application No. PCT/CN2011/083643; dated Sep. 20, 2012.
(Continued)

Primary Examiner — Alvin Zhu
Assistant Examiner — Bo Hui A Zhu
(74) Attorney, Agent, or Firm — Brinks Gilson & Lione

(57) ABSTRACT

Embodiments of the present disclosure disclose a service transmission method and a device and a system for implementing the method. The method includes: recognizing a type of a received client service, encapsulating an OTN service, and generating an OTN signal frame or a lower order ODU; querying a tag forwarding base to acquire forwarding information of the OTN signal frame or the lower order ODU; acquiring tag information, and inserting the tag information into an overhead of the OTN signal frame or the lower order ODU; and forwarding the OTN signal frame according to the forwarding information. Therefore, in the embodiments of the present disclosure, the forwarding and the transmission of the service may be performed in an OTN plane only, thereby reducing hardware modules of an MPLS plane.

24 Claims, 19 Drawing Sheets

(51) Int. Cl.
*H04J 3/16* (2006.01)
*H04L 12/931* (2013.01)
*H04L 12/723* (2013.01)

(52) U.S. Cl.
CPC ....... *H04J 14/0258* (2013.01); *H04J 14/0273* (2013.01); *H04J 14/0284* (2013.01); *H04J 2203/0053* (2013.01); *H04L 45/50* (2013.01)

(56) References Cited

U.S. PATENT DOCUMENTS

| | | |
|---|---|---|
| 7,106,746 B1 | 9/2006 | Dorbolo |
| 2003/0097471 A1 | 5/2003 | Grammel |
| 2004/0105459 A1* | 6/2004 | Mannam ............... H04J 3/14 370/465 |
| 2004/0170173 A1 | 9/2004 | Pan et al. |
| 2011/0188857 A1 | 8/2011 | Zheng |
| 2011/0262128 A1 | 10/2011 | Madrahalli et al. |
| 2011/0318001 A1 | 12/2011 | Li et al. |

FOREIGN PATENT DOCUMENTS

| | | |
|---|---|---|
| CN | 101854220 A | 10/2010 |
| CN | 101931587 A | 12/2010 |

OTHER PUBLICATIONS

"Ethernet Transmission Package over OTN Control Plane" China Electronic Journal Publishing House. © 1994-2013.

* cited by examiner

SERVICE TRANSMISSION METHOD IN AN OPTICAL TRANSPORT NETWORK AND DEVICE AND SYSTEM FOR IMPLEMENTING THE METHOD

CROSS-REFERENCE TO RELATED APPLICATIONS

This application is a continuation of International Application No. PCT/CN2011/083643, filed on Dec. 7, 2011, which is hereby incorporated by reference in its entirety.

FIELD

The present disclosure relates to the field of OTN (Optical transport network, optical transport network), and in particular, to a service transmission method and a device and a system for implementing the method.

BACKGROUND

Internet protocol (IP, Internet Protocol) services gradually become a mainstream in a bearer network, the proportion of time division multiplexing (TDM, Time Division Multiplexing) services is continuously declining. Therefore, routers are increasingly adopted in networking of the bearer network. In another aspect, with the rapid growth of service traffic, in order to provide a reliable transmission capability with a large capacity, a wavelength division multiplexing/an optical transport network (WDM/OTN, Wavelength Division Multiplexing/Optical transport network) technology is more widely applied in the bearer network. Therefore, in the bearer network, data between routers is transmitted by WDM/OTN devices, thereby forming a double-layer network architecture including WDM/OTN devices plus routers as shown in FIG. 2. A service processing process thereof is shown in FIG. 2. In FIG. 2, ETH (Ethernet) indicates an Ethernet, ETH PHY (Physical) indicates an Ethernet physical layer, and ETH MAC (Media Access Control) indicates an Ethernet media access control layer.

It may be seen from FIG. 2 that, all the services need to be processed by the routers. With the continuous increase of the service traffic, the demand for capacity of the router grows, the development of the router gradually encounters bottlenecks in terms of size and power consumption, and actual deployment is difficult. In the future, the capacity of the router is probably incapable of satisfying the demand of the network.

In order to solve the foregoing problems, a solution shown in FIG. 3 may be adopted: multiprotocol label switching (MPLS, Multiprotocol Label Switching) switches may be used at core node devices to replace the routers. In the solution, an MPLS switching technology is adopted in the core node devices to replace an IP forwarding technology in the router. Label switching is to label a packet so as to replace IP forwarding with the label switching. Compared with the router, the MPLS switch provides simpler processing, has smaller power consumption and a higher integration level. Meanwhile, the MPLS switch may also implement a bandwidth statistical multiplexing function. Therefore, the bandwidth of the network barely increases as compared with router networking. A service processing process of the solution is shown in FIG. 4.

In the solution, the WDM/OTN devices need to support large-capacity data transmission. Therefore, the OTN layer is retained. It means that hardware design such as encapsulation and monitoring of the OTN layer, and software design such as maintenance and administration still exist, and the cost cannot be reduced by a large degree. Moreover, the maintenance and administration of the OTN layer are different from the maintenance and administration of the MPLS layer. Two planes, namely, the OTN layer and the MPLS layer, need to be designed in the core node, which increases complexity of the design of the device. The cost and the power consumption are still high.

SUMMARY

The embodiments of the present disclosure is to solve a problem by providing a solution for a bearer network, so as to directly implement dynamic service forwarding in an OTN layer, and be adaptive to demands of transmission and processing of a large-capacity service.

A service transmission method, where the method includes: receiving an optical transport network (OTN) signal frame sent by an upstream node, extracting tag information from an overhead of the OTN signal frame; querying a tag forwarding base according to the tag information, and acquiring forwarding information of the OTN signal frame; and forwarding the OTN signal frame to a downstream node according to the forwarding information.

A service transmission method is disclosed, where the method includes: recognizing a type of a received client service, encapsulating a non-optical transport network (OTN) service, and generating an OTN signal frame or a lower order optical channel data unit (ODU); querying a tag forwarding base to acquire forwarding information of the OTN signal frame or the lower order ODU; acquiring tag information, and inserting the tag information into an overhead of the OTN signal frame or the lower order ODU; and forwarding the OTN signal frame according to the forwarding information.

A first node device is disclosed, where the node device includes an overhead extraction module, an information acquisition module, a forwarding module and a maintenance module. The overhead extraction module is configured to receive an OTN signal frame sent by an upstream node, and extract tag information from an overhead of the OTN signal frame. The information acquisition module is configured to send a querying request to the maintenance module according to the tag information, acquire forwarding information of the OTN signal frame, and transmit the forwarding information to the forwarding module. The maintenance module is configured to establish and maintain a tag forwarding base, and acquire the forwarding information from the tag forwarding base according to the querying request. The forwarding module is configured to forward the OTN signal frame according to the forwarding information.

A second node device is disclosed, where the node device includes a service processing module, an information acquisition module, an overhead insertion module and a maintenance module. The service processing module is configured to recognize a type of a received client service, encapsulate a non-OTN service, generate an OTN signal frame or a lower order ODU, transmit the OTN signal frame or the lower order ODU to the overhead insertion module, and send a tag application to the information acquisition module so as to acquire tag information and forwarding information of the OTN signal frame or those of the lower order ODU. The information acquisition module is configured to send a querying request to the maintenance module according to the tag application, acquire the tag information and the forwarding information of the OTN signal frame or those of the lower order ODU, and transmit the tag information and the forwarding information to the overhead insertion module. The maintenance module is configured to establish and maintain a tag forwarding base, acquire the forwarding information from the tag forwarding base in response to the querying request, allocate the tag information of the OTN signal frame or that of the lower order ODU, and return the forwarding information and the tag information to the information acquisition module. The overhead insertion module is configured to insert the tag information into an overhead of a corresponding OTN signal frame or lower order ODU, and forward the OTN signal frame or the lower order ODU according to the forwarding information.

A service transmission system is disclosed, where the system includes a first node device and a second node device.

In the embodiments of the present disclosure, the OTN technology is adopted in both forwarding and transmission of the service. Therefore, in the embodiments of the present disclosure, the forwarding and the transmission of the service may be performed in an OTN plane only, so that hardware modules of an MPLS plane are reduced, the maintenance and the administration are simple, and the device is not complex.

BRIEF DESCRIPTION OF THE DRAWINGS

To illustrate the solutions according to the embodiments of the present disclosure or in the prior art more clearly, the accompanying drawings for describing the embodiments or the prior art are introduced briefly in the following. Apparently, the accompanying drawings in the following description are some embodiments of the present disclosure, and persons skilled in the art may derive other drawings from the accompanying drawings without creative efforts.

DETAILED DESCRIPTION OF THE EMBODIMENTS

Figure 5:
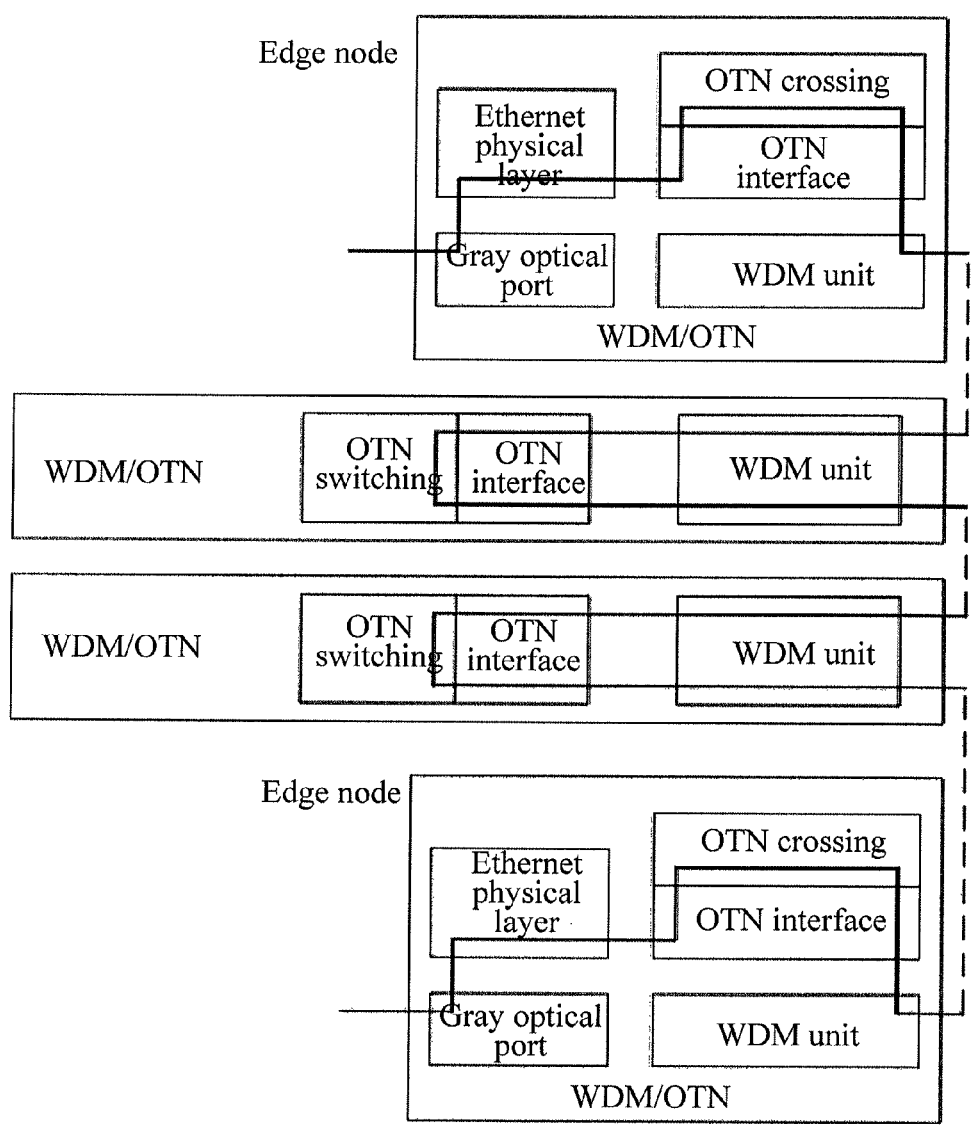
FIG. 5 is a schematic diagram of a third network architecture provided by an embodiment of the present disclosure.

As shown in FIG. 5, a node device provided by an embodiment of the present disclosure directly implements service forwarding and transmission in an OTN layer, provides a bandwidth statistical multiplexing capability, and is adaptive to demands of the transmission and processing of a large-capacity service.

The solution of the present disclosure is to be clearly described in the following with reference to the accompanying drawings. It is obvious that the embodiments to be described are a part rather than all of the embodiments of the present disclosure. All other embodiments obtained by persons skilled in the art based on the embodiments of the present disclosure without creative efforts shall fall within the protection scope of the present disclosure.

In following embodiments, an intermediate node of a bearer network is taken as an example to illustrate a process of a service transmission method. The intermediate node refers to that the node device forwards a received OTN frame, and does not decapsulate the OTN frame to extract the service.

Figure 6:
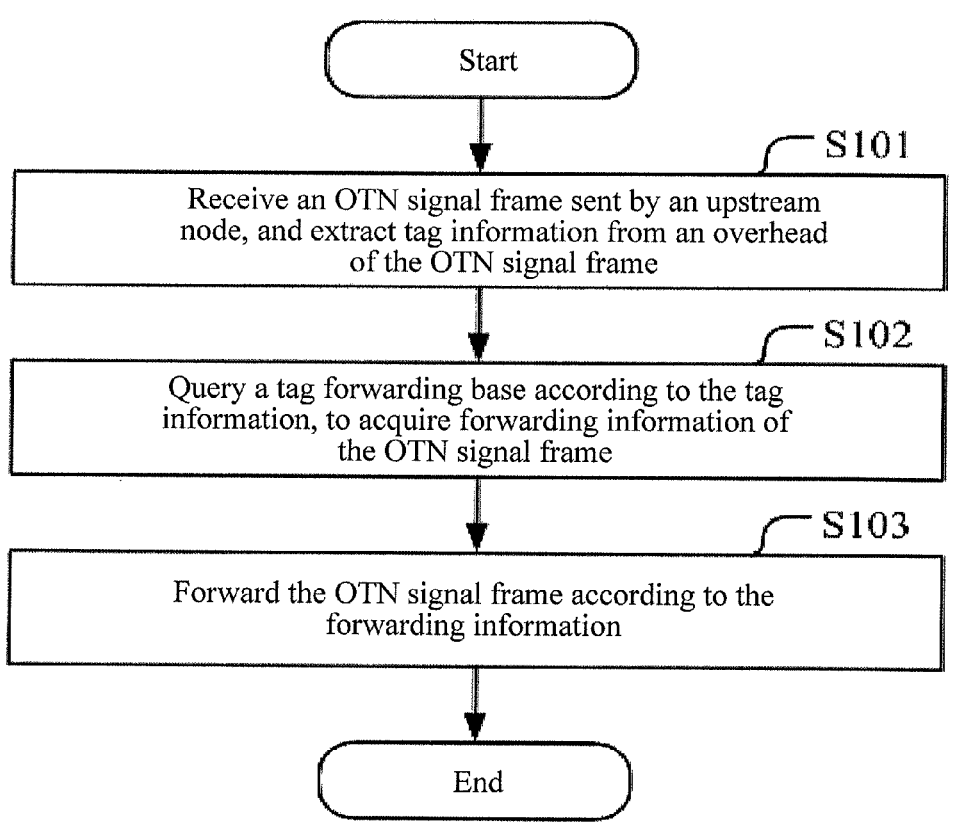
FIG. 6 is a schematic flow chart of a first embodiment of a service switching method provided by the present disclosure.

FIG. 6 is a schematic flow chart of a first embodiment of a service transmission method provided by the present disclosure provide. The service transmission method includes:

Step S101: Receive an OTN signal frame sent by an upstream node, and extract tag information from an overhead of the OTN signal frame. The upstream node may be an intermediate node, or may also be an edge node.

The tag information may be a multiprotocol label switching (MPLS, multiprotocol label switching) label, and correspondingly, an MPLS switching protocol is applied in the service transmission method of each embodiment of the present disclosure. The tag information may also be a tag similar to an Internet protocol (IP, Internet Protocol) address, and correspondingly, an IP forwarding protocol is applied in the service transmission method of each embodiment of the present disclosure. The tag information may also be other tag information, which is not limited here.

Figure 7:
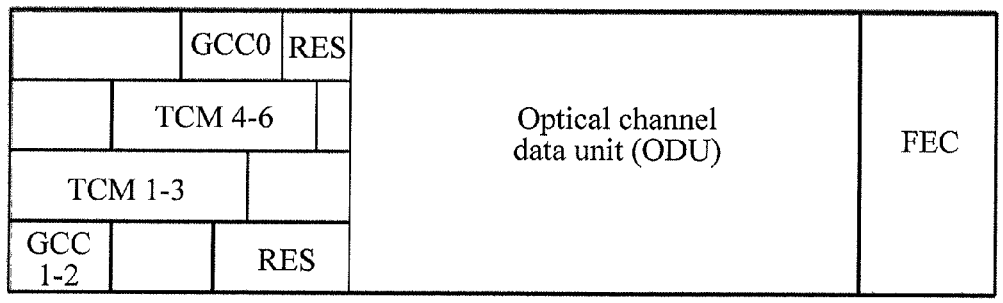
FIG. 7 is a schematic structural diagram of an overhead of an OTN signal frame provided by an embodiment of the present disclosure.
Figure 8:
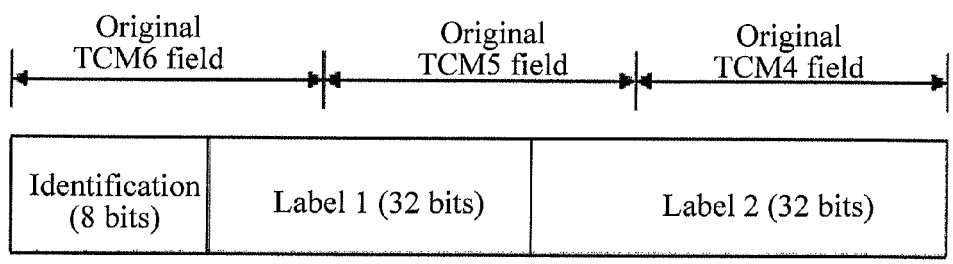
FIG. 8 is a schematic structural diagram of tag information provided by an embodiment of the present disclosure.
Figure 8:
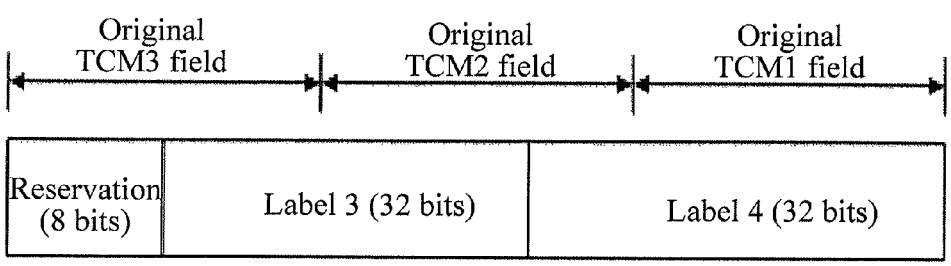

Referring to FIG. 7 and FIG. 8, the tag information in the embodiment of the present disclosure adopts an MPLS label. The tag information includes an identification field and a label field, and is recorded in a tandem connection monitoring (TCM, Tandem Connection Monitoring) field. The identification is used to recognize whether the information recorded in the TCM field is the tag information, or TCM information. The label is configured to forward a client service. For example, the label is a short identifier with a fixed length, and is used to uniquely identify a forwarding equivalence class (FEC, forwarding equivalence class) to which a packet belongs. The FEC is a term in an MPLS technology, and refers to a group of service packets processed in the same manner in a service forwarding process. Same MPLS labels are allocated to the services in a service packet. The FEC may be identified as a destination address prefix, a virtual private network (VPN, virtual private network), or a traffic engineering tunnel.

Step S102: Query a tag forwarding base according to the tag information to acquire forwarding information of the OTN signal frame. The tag forwarding base is similar to a routing base, and maintains a mirror image of the forwarding information of the service. For example, the tag forwarding base, based on information in the routing base, maintains address information of a next network segment. When a routing or topology structure in the network changes, the tag forwarding base is updated.

The tag forwarding base may be a forward information base (FIB, Forward information base) in the IP forwarding technology, or a label forwarding information base (LFIB, label forwarding information base) in the MPLS switching technology.

In an embodiment of adopting the IP forwarding protocol, the tag information includes an IP address and an MAC address. A routing information base (RIB, routing information base) is generated according to a signaling packet related to a routing protocol as well as operation, administration and maintenance (OAM, operation, administration and maintenance) information of a link layer, and then a forward information base (FIB, forward information base) is generated according to the routing information base (RIB).

In an embodiment of adopting the MPLS switching protocol, the tag information is the MPLS label. A routing information base (RIB) is generated according to a signaling packet related to a routing protocol and OAM information of a link layer, and a label forwarding information base (LFIB) is generated according to the routing information base (RIB), a signaling packet related to a label distribution protocol (LDP, label distribution protocol), and the OAM information of the link layer.

Step S103: Forward the OTN signal frame according to the forwarding information.

The tag forwarding base in the embodiment may be configured in advance, and may also be generated according to related information such as the routing protocol, and a label publishing protocol. In a second embodiment shown in FIG. 9, the tag forwarding base is generated according to related information such as the routing protocol, and the label publishing protocol.

Figure 9:
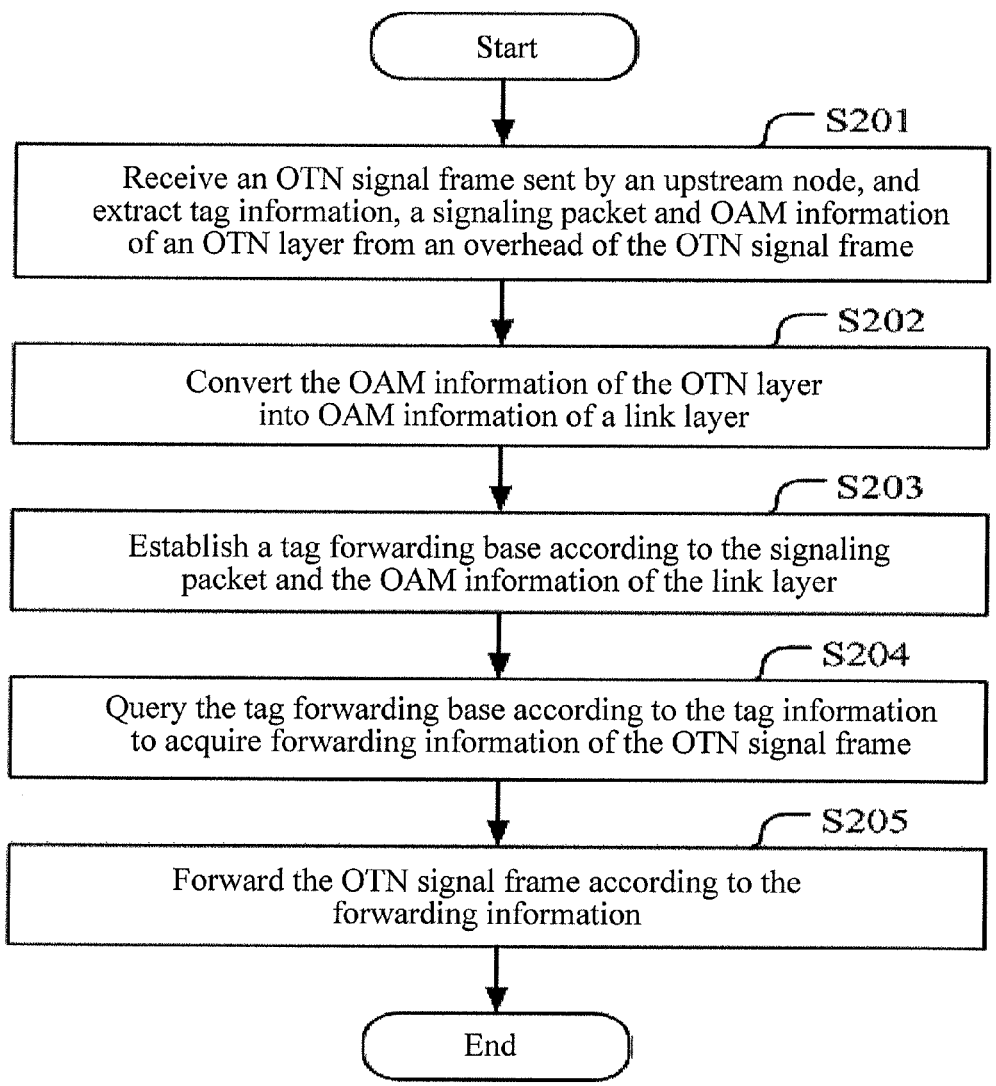
FIG. 9 is a schematic flow chart of a second embodiment of a service transmission method provided by the present disclosure.

Referring to FIG. 9, FIG. 9 is a schematic flow chart of a second embodiment of a service transmission method provided by the present disclosure. The service transmission method includes:

Step S201: Receive an OTN signal frame sent by an upstream node, and extract tag information, a signaling packet and OAM information of an OTN layer from an overhead of the OTN signal frame.

Referring to FIG. 7, the signaling packet in the embodiment of the present disclosure may adopt an IP over GCC protocol, and is borne in a general communication channel (GCC, general communication channel) field of the OTN signal frame, where the GCC field includes one or both of a GCC0 field and a GCC1-2 field. Further, in order to transmit more information, a reservation (RES, reservation) field in the overhead of the OTN signal frame may also be used as the GCC field. The signaling packet is at least used to propagate routing information, and further, the signaling packet may also be used for distribution (distribution) of the tag information to the upstream node. When the signaling packet is only used to propagate the routing information, the service transmission method provided by this embodiment is applicable to switching similar to IP switching. When the signaling packet is further used to distribute the tag information to the upstream node, the service transmission method provided by this embodiment is applicable to MPLS switching, GMPLS (Generalized MPLS) switching, and MPLS-TP (MPLS Transport Profile) switching. Further, the signaling packet may further be used to propagate bandwidth information, so as to be applicable to MPLS-TE (MPLS Traffic Engineering) switching.

The tag information, the signaling packet and the OAM information of the OTN layer may also be recorded in other fields in the overhead of the OTN signal frame, which is not limited by the embodiment of the present disclosure.

Step S202: Convert the OAM information of the OTN layer into OAM information of a link layer.

Step S203: Establish a tag forwarding base according to the signaling packet and the OAM information of the link layer.

Step S204: Query the tag forwarding base according to the tag information to acquire forwarding information of the OTN signal frame.

Step S205: Forward the OTN signal frame according to the forwarding information.

A downstream node of an intermediate node implementing the service transmission method described in the foregoing two embodiments is an edge node. If the downstream node of the intermediate node is still an intermediate node, the service transmission method implemented by the intermediate node is described in the following two embodiments.

Figure 10:
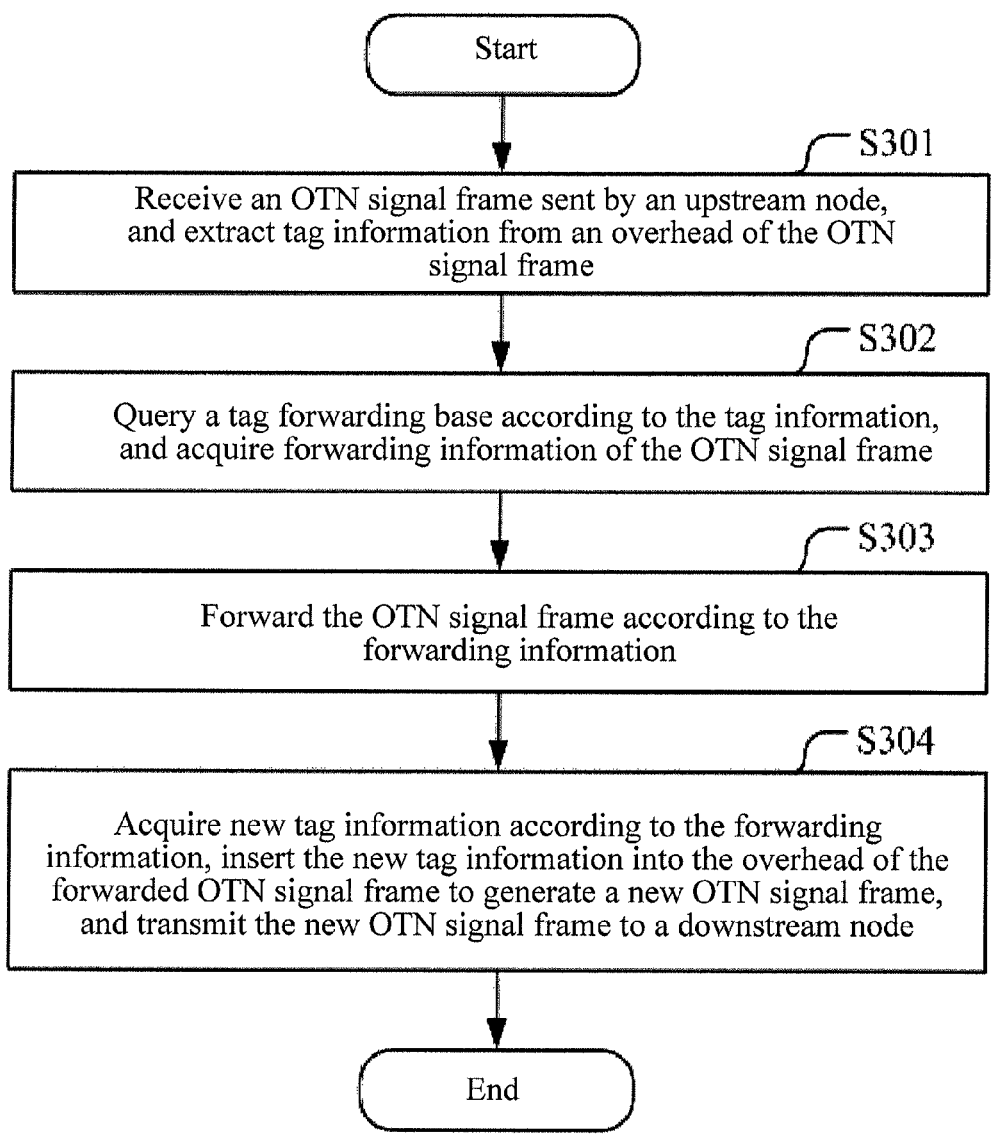
FIG. 10 is a schematic flow chart of a third embodiment of a service transmission method provided by the present disclosure.

Referring to FIG. 10, FIG. 10 is a schematic flow chart of a third embodiment of a service transmission method provided by the present disclosure. The service transmission method includes:

Step S301: Receive an OTN signal frame sent by an upstream node, and extract tag information from an overhead of the OTN signal frame.

Step S302: Query a tag forwarding base according to the tag information to acquire forwarding information of the OTN signal frame.

Step S303: Forward the OTN signal frame according to the forwarding information.

Step S304: Acquire new tag information according to the forwarding information, insert the new tag information into the overhead of the forwarded OTN signal frame to generate a new OTN signal frame, and transmit the new OTN signal frame to a downstream node.

In an embodiment of adopting an IP forwarding protocol, a new MAC address is generated according to the acquired forwarding information, the original MAC address in the tag information is replaced with the new MAC address, so as to generate the new tag information. In an embodiment of adopting an MPLS switching protocol, the new tag information is extracted from the forwarding information.

Figure 11:
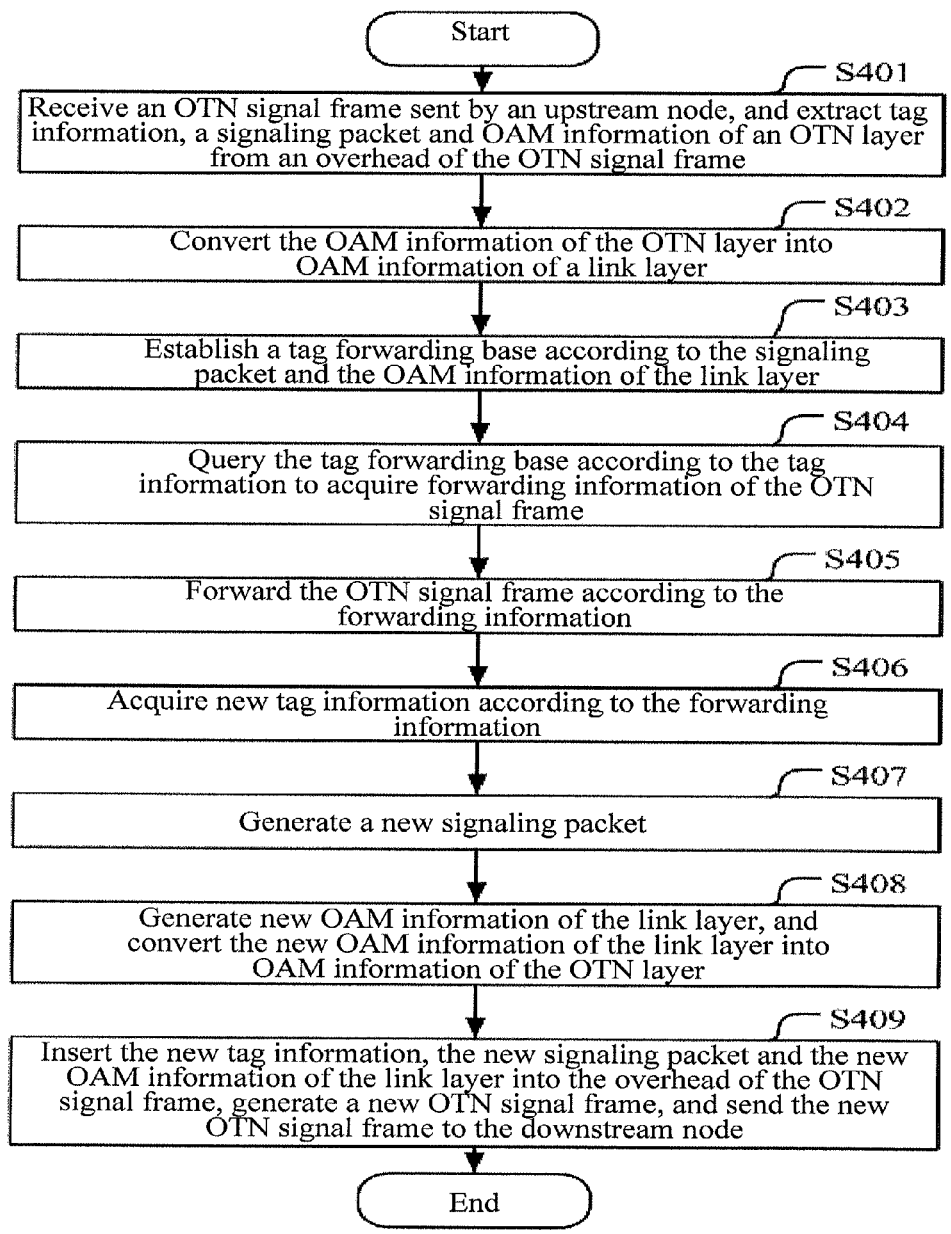
FIG. 11 is a schematic flow chart of a fourth embodiment of a service transmission method provided by the present disclosure.

Referring to FIG. 11, FIG. 11 is a schematic flow chart of a fourth embodiment of a service transmission method provided by the present disclosure. The service transmission method includes:

Step S401: Receive an OTN signal frame sent by an upstream node, and extract tag information, a signaling packet and OAM information of an OTN layer from an overhead of the OTN signal frame.

Step S402: Convert the OAM information of the OTN layer into OAM information of a link layer.

Step S403: Establish a tag forwarding base according to the signaling packet and the OAM information of the link layer.

Step S404: Query the tag forwarding base according to the tag information to acquire forwarding information of the OTN signal frame.

Step S405: Forward the OTN signal frame according to the forwarding information.

Step S406: Acquire new tag information according to the forwarding information. For example, the new tag information is inserted into a tandem connection monitoring (TCM) field of the overhead of the OTN signal frame. In an embodiment of adopting an IP forwarding protocol, a new MAC address is generated according to the forwarding information, and an original MAC address in the tag information is replaced with the new MAC address, so as to generate the new tag information. In an embodiment of adopting an MPLS switching protocol, the new tag information is extracted from the forwarding information.

Step S407: Generate a new signaling packet.

Step S408: Generate new OAM information of the link layer, and convert the new OAM information of the link layer into OAM information of the OTN layer. The new OAM information of the link layer includes OAM information that needs to be sent to the downstream node.

Step S409: Insert the new tag information, the new signaling packet and the new OAM information of the link layer into the forwarded overhead of the OTN signal frame, generate a new OTN signal frame, and send the new OTN signal frame to the downstream node.

An optical channel data unit (ODU) includes a higher order ODU and a lower order ODU. In the foregoing embodiment, the intermediate node in the bearer network only supports signal switching of the higher order ODU. When the intermediate node in the bearer network supports signal switching of the higher order ODU and the lower order ODU at the same time, a service transmission solution is basically the same as the foregoing embodiment, and the difference only lies in that, the steps of demultiplexing a received higher order ODU into the lower order ODU, forwarding the lower order ODU, and multiplexing the forwarded lower order ODU into the higher order ODU are added in the process, which are not described here again.

In the embodiment of the present disclosure, the OTN technology is adopted for both forwarding and transmission of the service. Therefore, in the embodiments of the present disclosure, the forwarding and transmission of the service may be performed in an OTN plane only, so that hardware modules of an MPLS plane are reduced, the maintenance and the administration are simple, and the device is not complex.

Services received by a part of the node devices in the optical transport network (OTN), especially an edge node, may not be the OTN signal frame, or, even it is the OTN signal frame, the tag information is not inserted into the overhead of the OTN signal frame. How such node devices implement service transmission in the OTN layer is to be disclosed in the following embodiment.

Figure 1:
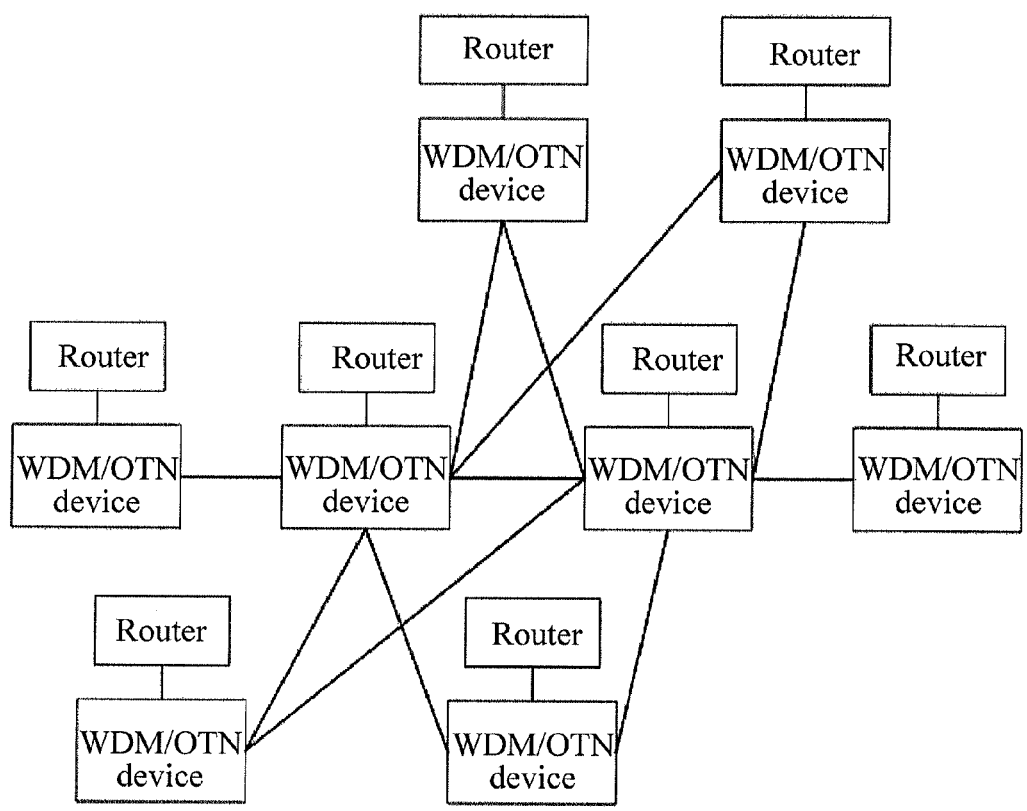
FIG. 1 is a schematic diagram of a first network architecture of WDM/OTN devices plus routers in the prior art.
Figure 2:
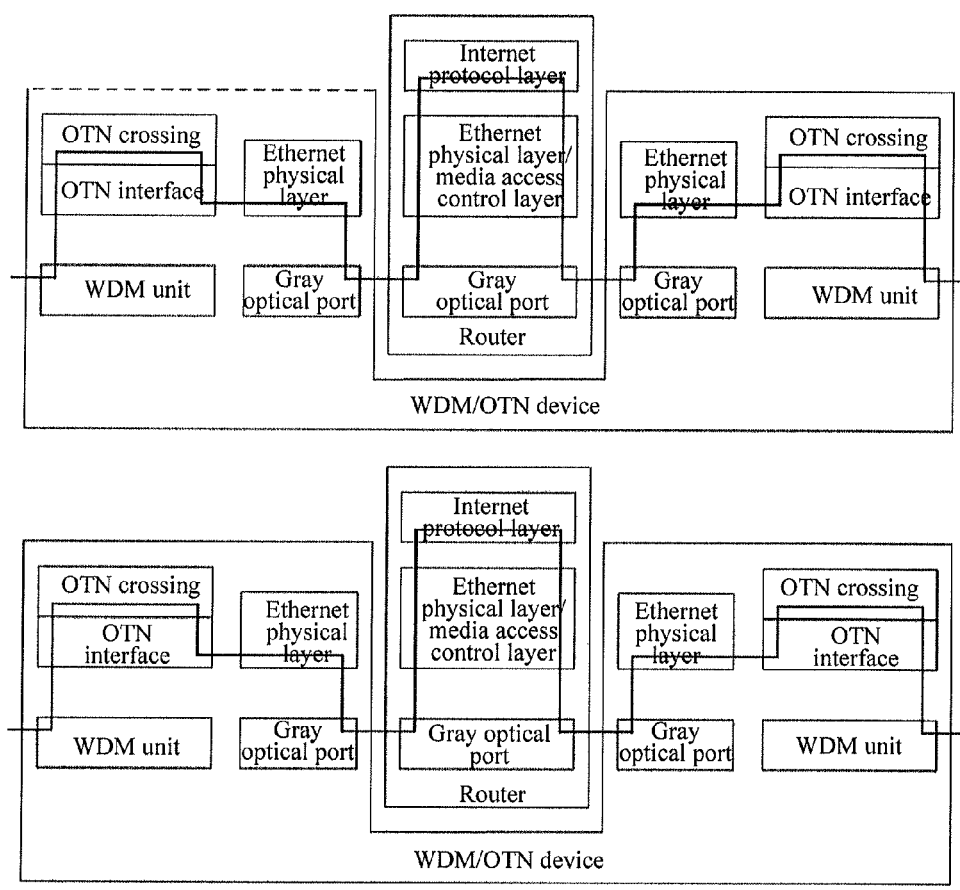
FIG. 2 is a schematic flow chart of service processing of the first network architecture.
Figure 3:
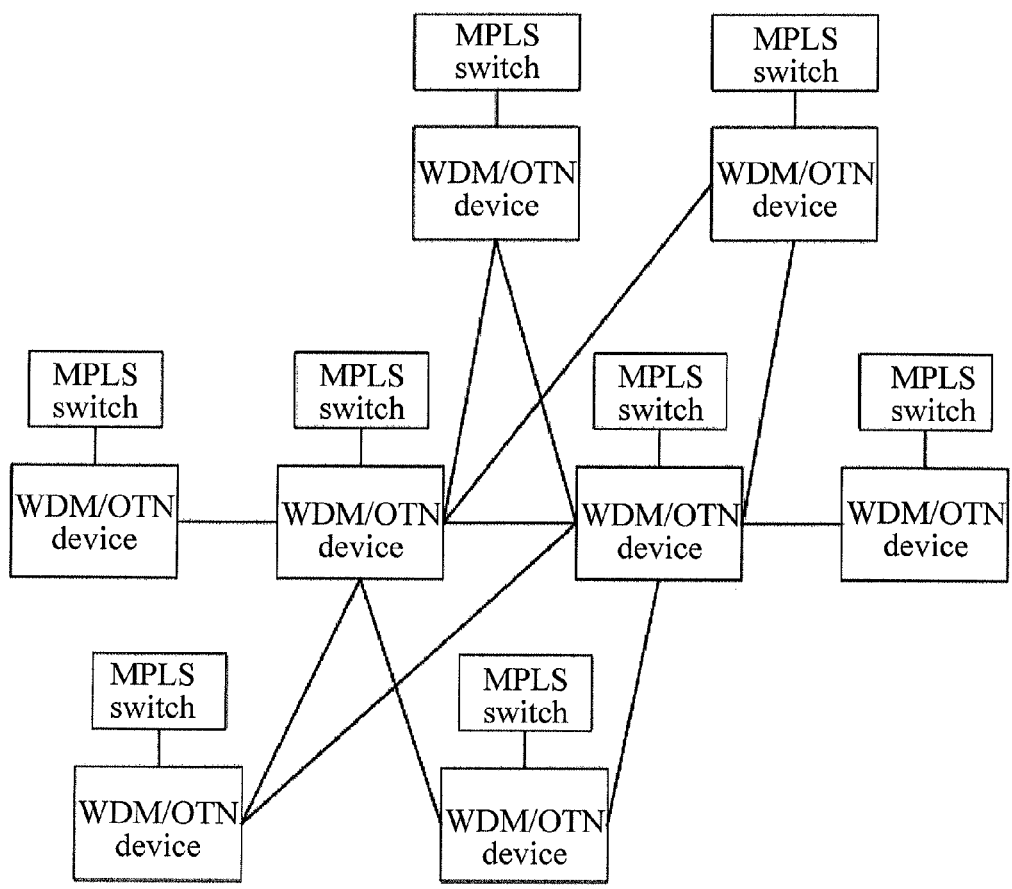
FIG. 3 is a schematic diagram of a second network architecture in which routers are replaced with MPLS switches in the prior art.
Figure 4:
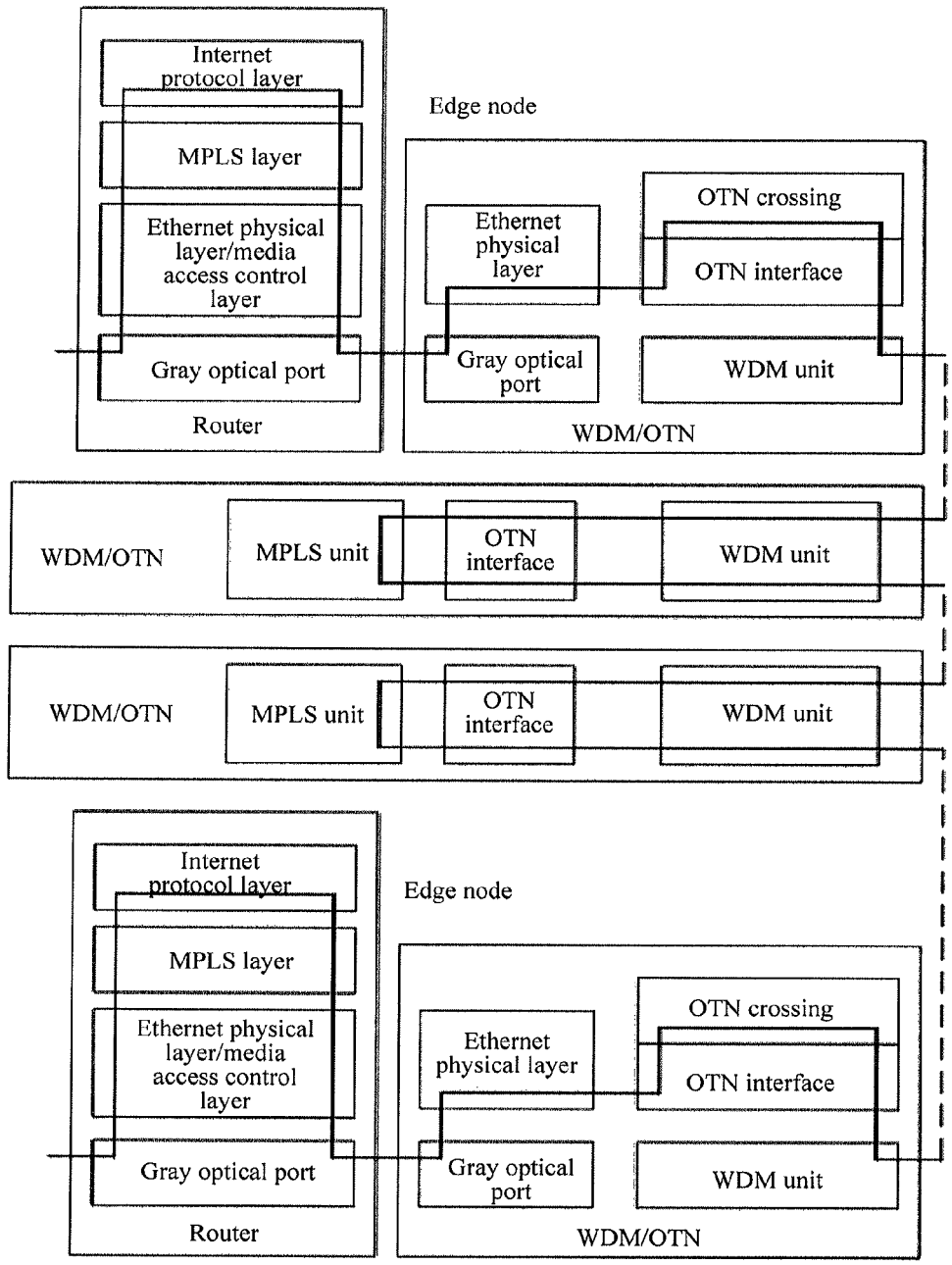
FIG. 4 is a schematic flow chart of service processing of the second network architecture.
Figure 12:
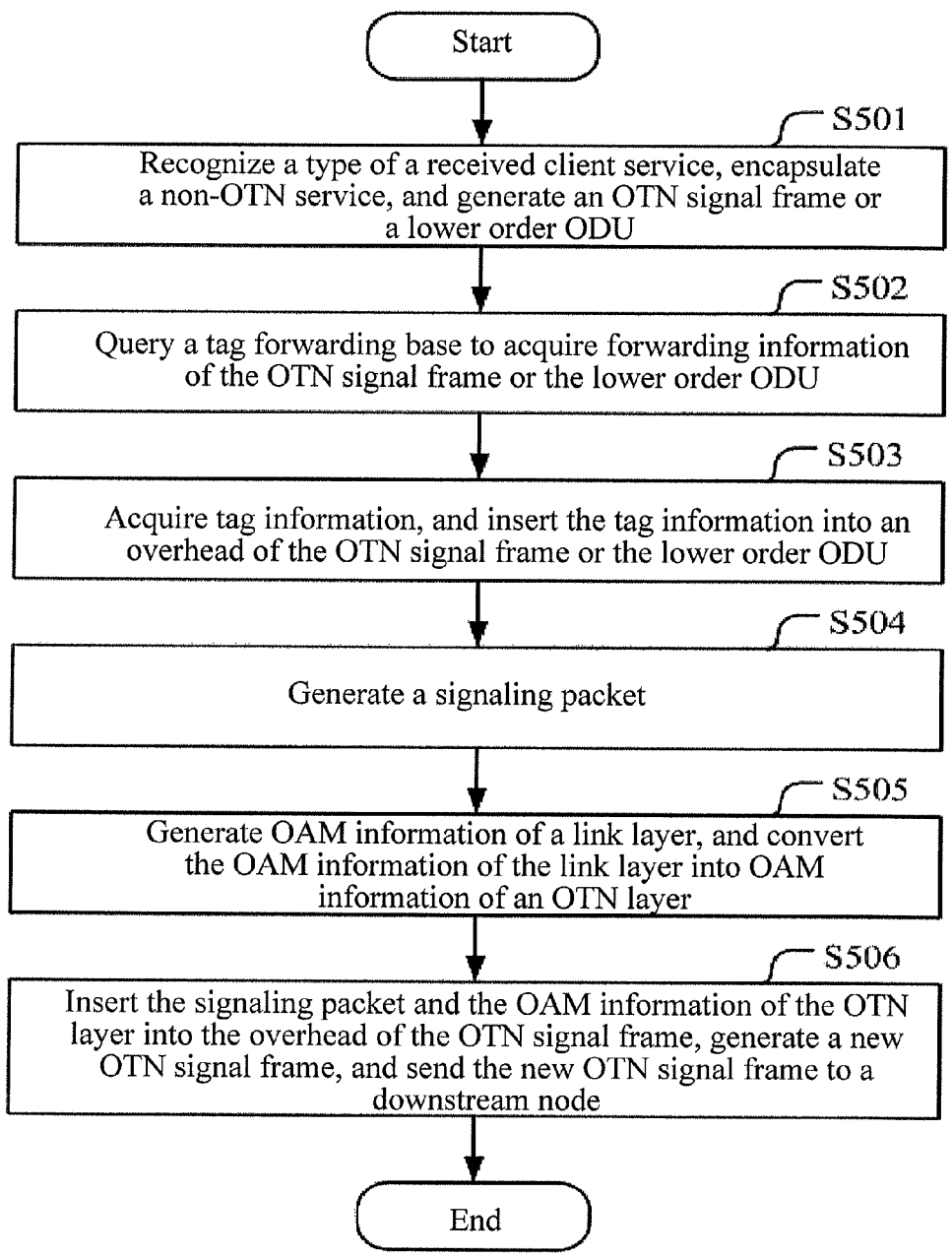
FIG. 12 is a schematic flow chart of a fifth embodiment of a service transmission method provided by the present disclosure.

Referring to FIG. 12, FIG. 2 is a schematic flow chart of a fifth embodiment of a service transmission method provided by the present disclosure. The service transmission method is applied to service processing of an edge node in a sending direction, which includes:

Step S501: Recognize a type of a received client service, encapsulate a non-OTN service, and generate an OTN signal frame or a lower order ODU.

The service transmission method provided by this embodiment selects different processing processes according to types of services. For example, when it is determined that a client service is a TDM service, if the TDM service is an OTN signal frame, step S502 is directly performed, and step S501 is omitted. If the TDM service is not an OTN signal frame, for example, the TDM service is a synchronous digital hierarchy (SDH, synchronous digital hierarchy) signal, the TDM service is encapsulated, and the OTN signal frame is generated.

When it is determined that the received client service is an IP service, a packet header of the IP service is analyzed, and based on a forwarding equivalence class (FEC, forwarding equivalence class) rule, the IP packet is sent to a corresponding IP packet queue. The IP packet queue is encapsulated to generate an OTN signal frame.

The forwarding equivalence class (FEC) is a term in an MPLS technology, and refers to that a group of service packets are processed in the same manner in a service forwarding process. Same MPLS labels are allocated to the services in the service packet. The forwarding equivalence class (FEC) may be identified as a destination address prefix, a virtual private network (VPN, virtual private network), or a traffic engineering tunnel.

In this embodiment, in order to apply an MPLS switching protocol to the optical transport network (OTN), a concept of forwarding equivalence class (FEC) is introduced. It should be noted that, the IP service may also be classified according to other classification rules.

Step S502: Query a tag forwarding base to acquire forwarding information of the OTN signal frame or the lower order ODU. The tag forwarding base is similar to a routing base, and maintains a mirror image of the forwarding information of the service. For example, the tag forwarding base, based on information in the routing base, maintains address information of a next network segment. When a routing or topology structure in the network changes, the tag forwarding base is updated.

The tag forwarding base may be a forward information base (FIB, Forward information base) in an IP forwarding technology, or a label forwarding information base (LFIB, label forwarding information base) in an MPLS switching technology.

In an embodiment of adopting the IP forwarding protocol, a routing information base (RIB, routing information base) is generated according to a signaling packet related to a routing protocol and OAM information of a link layer, and a forward information base (FIB, forward information base) is generated according to the routing information base (RIB).

In an embodiment of adopting the MPLS switching protocol, a routing information base (RIB) is generated according to a signaling packet related to a routing protocol and OAM information of a link layer, and a label forwarding information base (LFIB) is generated according to the routing information base (RIB), a signaling packet related to a label distribution protocol (LDP, label distribution protocol), and the OAM information of the link layer.

Step S503: Acquire tag information, and insert the tag information into an overhead of the OTN signal frame or the lower order ODU.

Multiple lower order ODUs are multiplexed into a higher order ODU, and a new OTN signal frame is generated after an overhead is added to the higher order ODU.

In the embodiment of adopting the IP forwarding protocol, the tag information includes an IP address and an MAC address. In an embodiment of adopting the MPLS switching protocol, the tag information is an MPLS label.

Step S504: Generate a signaling packet. For example, the signaling packet is inserted into one or both of a GCC0 field and a GCC1-2 field in the overhead of the OTN signal frame. Further, in order to transmit more information, a reservation (RES, reservation) field in the overhead of the OTN signal frame may also be used as the GCC field.

Step S505: Generate OAM information of a link layer, and convert the OAM information of the link layer into OAM information of an OTN layer.

Step S506: Insert the signaling packet and the OAM information of the OTN layer into the overhead of the OTN signal frame to generate a new OTN signal frame, send the new OTN signal frame to a downstream node, so that a node device receiving the new OTN signal frame implements direct service forwarding in the OTN layer.

In the embodiment, the tag forwarding base is generated according to related information such as the routing protocol, and a label publishing protocol. If the tag forwarding base is configured in advance, step S504 and step S505 are omitted, and correspondingly, only the tag information of the OTN signal frame is inserted into the overhead of the OTN signal frame which is sent to the downstream node in step S506.

Figure 13:
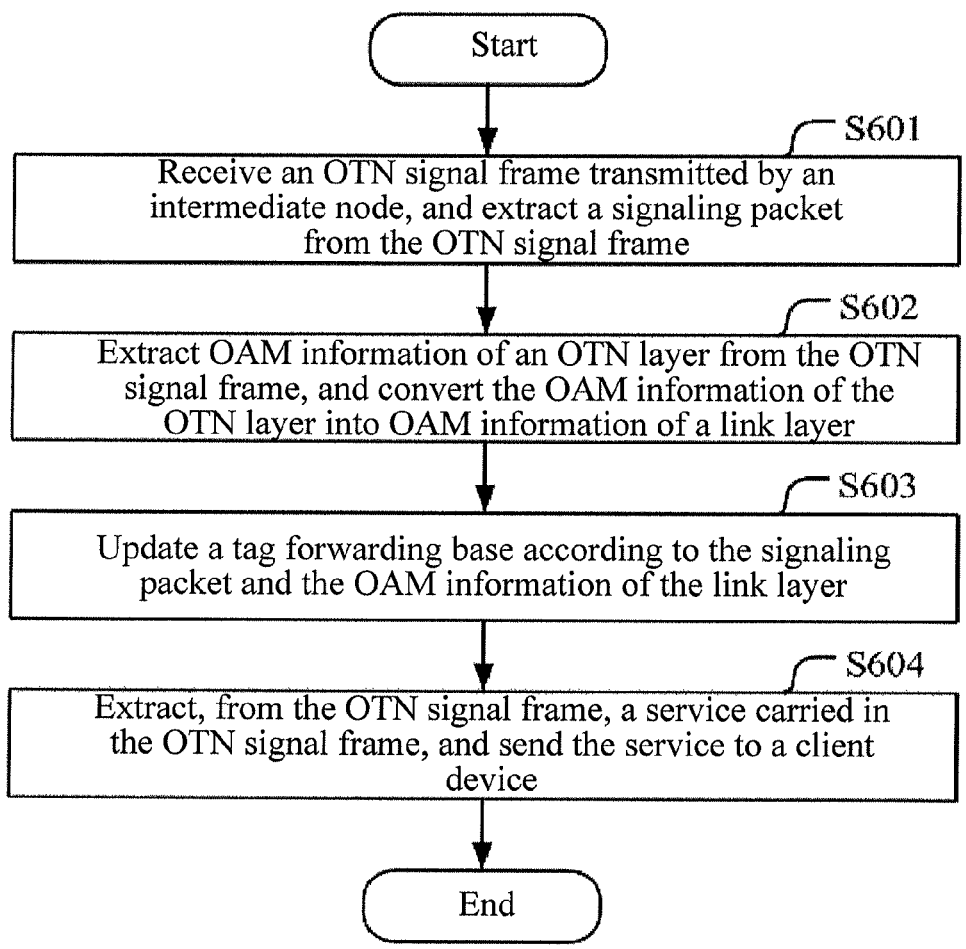
FIG. 13 is a schematic flow chart of a sixth embodiment of a service transmission method provided by the present disclosure.

Referring to FIG. 13, FIG. 13 a schematic flow chart of a sixth embodiment of a service transmission method provided by the present disclosure. The service transmission method is applied to service processing of an edge node in a sending direction, which includes:

Step S601: Receive an OTN signal frame transmitted by an intermediate node, and extract a signaling packet from the OTN signal frame.

Step S602: Extract OAM information of an OTN layer from the OTN signal frame, and convert the OAM information of the OTN layer into OAM information of a link layer.

Step S603: Update a tag forwarding base according to a signaling packet and the OAM information of the link layer.

Step S604: Extract, from the OTN signal frame, a service carried in the OTN signal frame, and send the service to a client device.

In this embodiment, if the tag forwarding base is configured in advance, steps S601 to S603 are omitted.

The structure of the intermediate node of the optical transport network (OTN) is disclosed in the following two embodiments, and the intermediate node may implement the service transmission method provided by the embodiment of the present disclosure.

Figure 14:
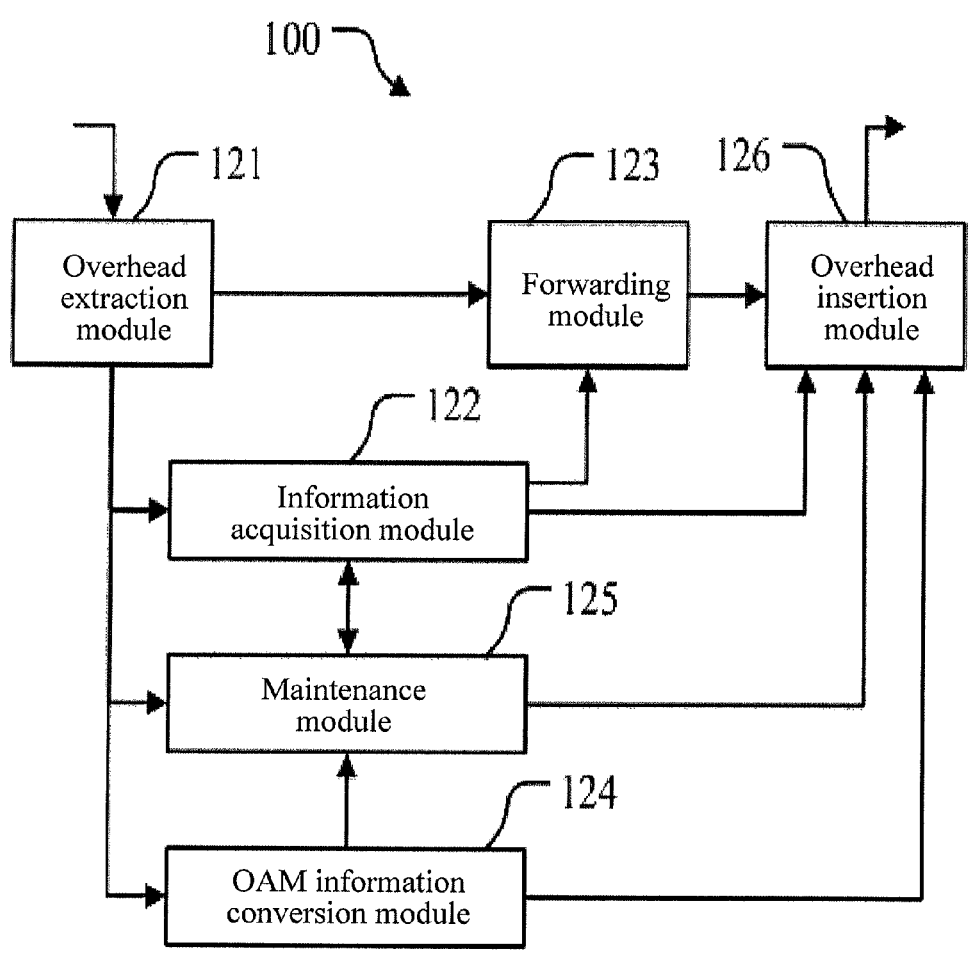
FIG. 14 is a schematic structural diagram of a first embodiment of an intermediate node provided by the present disclosure.

Referring to FIG. 14, FIG. 14 is a diagram of functional modules of a first embodiment of an intermediate node provided by the present disclosure. An intermediate node 100 includes an overhead extraction module 121, an information acquisition module 122, a forwarding module 123, an OAM information conversion module 124, a maintenance module 125 and an overhead insertion module 126.

The overhead extraction module 121 is configured to receive an OTN signal frame sent by an upstream node, extract tag information of the OTN signal frame, a signaling packet and OAM information of an OTN layer from an overhead of the OTN signal frame, transmit the tag information to the information acquisition module 122, transmit the OAM information of the OTN layer to the OAM information conversion module 124, and transmit the signaling packet to the maintenance module 125. The upstream node may be an intermediate node, or an edge node.

The tag information may be a multiprotocol label switching (MPLS, multiprotocol label switching) label, and correspondingly, an MPLS switching protocol is applied to the service transmission method of each embodiment of the present disclosure. The tag information may also be a tag similar to an IP address, and correspondingly, an IP forwarding protocol is applied to the service transmission method of each embodiment of the present disclosure. The tag information may also be other tag information, which is not limited here.

Referring to FIG. 7 and FIG. 8, the tag information in the embodiment of the present disclosure adopts an MPLS label. The tag information includes an identification field and a label field, and is recorded in a tandem connection monitoring (TCM, Tandem Connection Monitoring) field, or recorded in other fields in the overhead of the OTN signal frame, which is not limited in the embodiment of the present disclosure. The identification is used to recognize whether the information recorded in the TCM field is the tag information, or TCM information. The label is a short identifier with a fixed length, and is used to uniquely identify a forwarding equivalence class (FEC, forwarding equivalence class) to which a packet belongs. The FEC is a term in an MPLS technology, and refers to a group of service packets processed in the same manner in a service forwarding process. Same MPLS labels are allocated to the services in the service packet. The FEC may be identified as a destination address prefix, a virtual private network (VPN, virtual private network), or a traffic engineering tunnel.

The OAM information conversion module 124 is configured to convert the OAM information of the OTN layer into OAM information of a link layer, and transmit the OAM information of the link layer to the maintenance module 125.

The information acquisition module 122 is configured to send a querying request to the maintenance module 125 according to the tag information, acquire forwarding information of the OTN signal frame, and transmit the forwarding information to the forwarding module 123.

The maintenance module 125 is configured to establish a tag forwarding base according to the signaling packet and the OAM information of the link layer, and acquire the forwarding information from the tag forwarding base according to the querying request.

The tag forwarding base is similar to a routing base, and maintains a mirror image of the forwarding information of the service. For example, the tag forwarding base, based on information in the routing base, maintains address information of a next network segment. When a routing or topology structure in the network changes, the tag forwarding base is updated.

The tag forwarding base may be a forward information base (FIB, Forward information base) in an IP forwarding technology, or a label forwarding information base (LFIB, label forwarding information base) in an MPLS switching technology.

In an embodiment of adopting an IP forwarding protocol, the tag information includes an IP address and an MAC address. A routing information base (RIB, routing information base) is generated according to a signaling packet related to a routing protocol and OAM information of a link layer, and then a forward information base (FIB, forward information base) is generated according to the routing information base (RIB).

In an embodiment of adopting an MPLS switching protocol, the tag information is the MPLS label. A routing information base (RIB) is generated according to a signaling packet related to a routing protocol and OAM information of a link layer, and a label forwarding information base (LFIB) is generated according to the routing information base (RIB), a signaling packet related to a label distribution protocol (LDP, label distribution protocol), and the OAM information of the link layer.

The forwarding module 123 is configured to forward the OTN signal frame to the overhead insertion module 126 according to the forwarding information.

The information acquisition module 122 is further configured to acquire new tag information according to the forwarding information, and transmit the new tag information to the overhead insertion module 126

In an embodiment of adopting the IP forwarding protocol, the information acquisition module 122 generates a new MAC address according to the acquired forwarding information, replaces an original MAC address in the tag information with the new MAC address, so as to generate the new tag information. In an embodiment of adopting the MPLS switching protocol, the information acquisition module 122 extracts the new tag information from the forwarding information.

The maintenance module 125 is further configured to generate a new signaling packet and new OAM information of the link layer, transmit the new signaling packet to the overhead insertion module 126, and transmit the new OAM information of the link layer to the OAM information conversion module 124.

The OAM information conversion module 124 is further configured to convert the new OAM information of the link layer into OAM information of the OTN layer, and transmit the new OAM information of the OTN layer to the overhead insertion module 126.

The overhead insertion module 126 is configured to insert the new tag information, the new signaling packet and the new OAM information of the OTN layer into the overhead of the forwarded OTN signal frame, generate a new OTN signal frame, and send the new OTN signal frame to a downstream node.

In this embodiment, the tag forwarding base may be configured in advance, and may also be generated according to related information such as the routing protocol, and a label publishing protocol. When the tag forwarding base is configured in advance, as shown in FIG. 15, the intermediate node does not need the OAM information conversion module 124.

Figure 15:
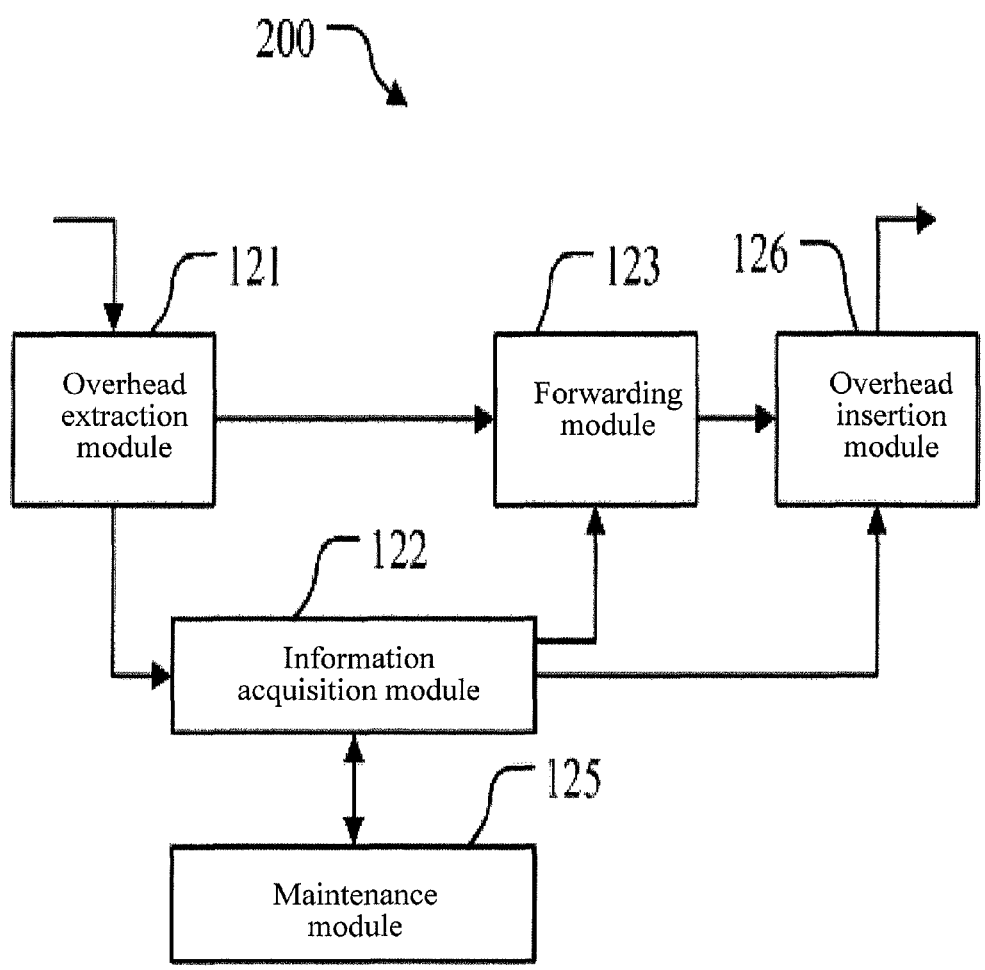
FIG. 15 is a schematic structural diagram of a second embodiment of an intermediate node provided by the present disclosure.

Referring to FIG. 15, FIG. 15 is a diagram of functional modules of a second embodiment of an intermediate node provided by the present disclosure is shown. An intermediate node 200 includes an overhead extraction module 121, an information acquisition module 122, a forwarding module 123, a maintenance module 125 and an overhead insertion module 126.

The overhead extraction module 121 is configured to receive an OTN signal frame sent by an upstream node, and extract tag information from an overhead of the OTN signal frame.

The information acquisition module 122 is configured to send a querying request to the maintenance module 125 according to the tag information, acquire forwarding information of the OTN signal frame, and transmit the forwarding information to the forwarding module 123.

The maintenance module 125 is configured to maintain a forwarding base, and acquire the forwarding information from the tag forwarding base according to the querying request.

The forwarding module 123 is configured to forward the OTN signal frame to the overhead insertion module 126 according to the forwarding information.

The information acquisition module 122 is further configured to acquire new tag information according to the forwarding information, and transmit the new tag information to the overhead insertion module 126.

The overhead insertion module 126 is configured to insert the new tag information into the overhead of the forwarded OTN signal frame, generate a new OTN signal frame, and transmit the new OTN signal frame to a downstream node.

In the foregoing two embodiments of the intermediate node, if the downstream node of the intermediate node is an edge node, the overhead insertion module 126 may be omitted, and correspondingly, the forwarding module 123 is further configured to transmit the OTN signal frame to the downstream node through a port.

Figure 16:
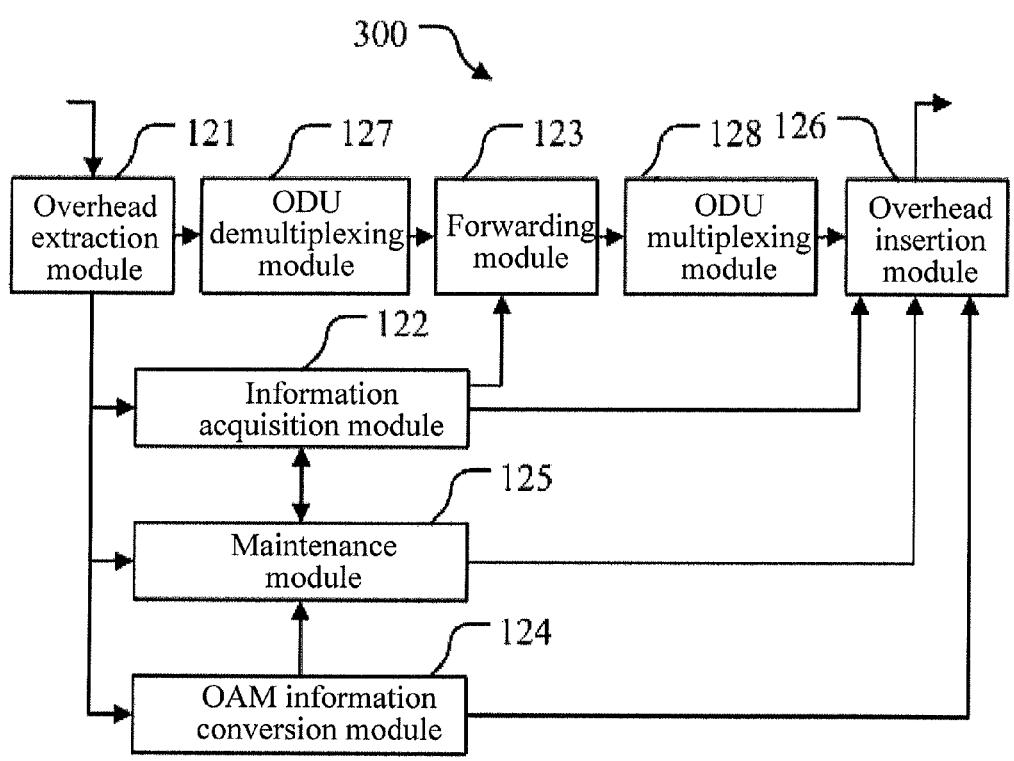
FIG. 16 is a schematic structural diagram of a third embodiment of an intermediate node provided by the present disclosure.
Figure 17:
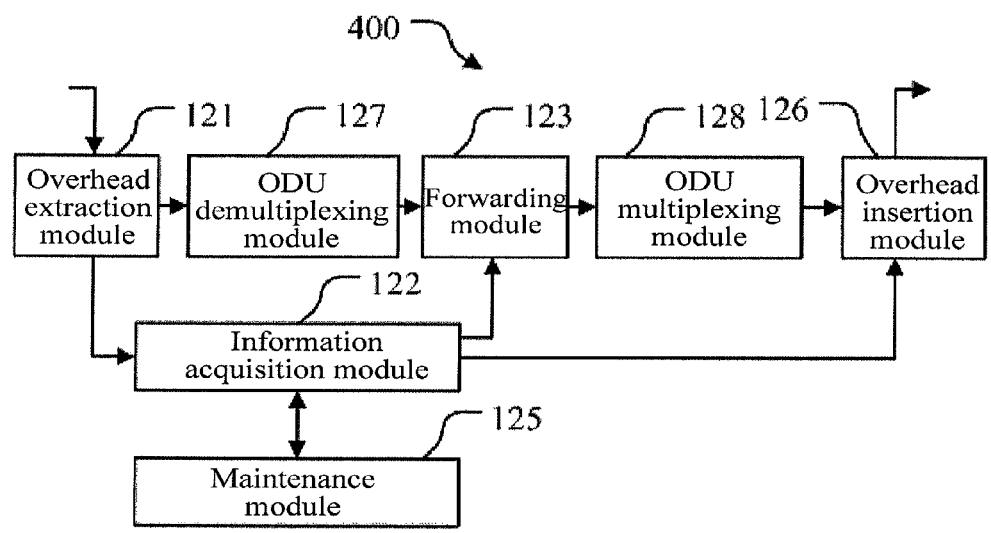
FIG. 17 is a schematic structural diagram of a fourth embodiment of an intermediate node provided by the present disclosure.

An optical channel data unit (ODU) includes a higher order ODU and a lower order ODU. An intermediate node 100 in this embodiment only supports forwarding of the higher order ODU. When the intermediate node supports the forwarding of the higher order ODU and the lower order ODU at the same time, the service transmission method is basically the same as this embodiment, and the difference only lies in that, as shown in FIGS. 16 and 17, intermediate nodes 300 and 400 further include an ODU demultiplexing module 127 and an ODU multiplexing module 128, which are located on two sides of the forwarding module 123 respectively. The ODU demultiplexing module 127 demultiplexes a received higher order ODU into a lower order ODU, the forwarding module 123 forwards the lower order ODU, and the ODU multiplexing module 128 multiplexes the forwarded lower order ODU into a higher order ODU, which is not described here again.

In the embodiment of the present disclosure, the forwarding and the transmission of the service may be performed in the OTN plane only, so that hardware modules of the MPLS plane are reduced, the maintenance and the administration are simple, and the device is not complex. In the embodiment of the present disclosure, the overhead of the OTN signal frame is adopted to bear OAM of the link layer, routing and label processing signaling, thereby improving a bandwidth utilization rate.

Besides the intermediate node, the bearer network in the embodiment of the present disclosure further includes an edge node. The edge node mainly completes functions of encapsulation and decapsulation from a client service to the OTN signal frame, and extraction of the client service from the OTN signal frame. The main functions of the edge node are disclosed in the following embodiment.

Figure 18:
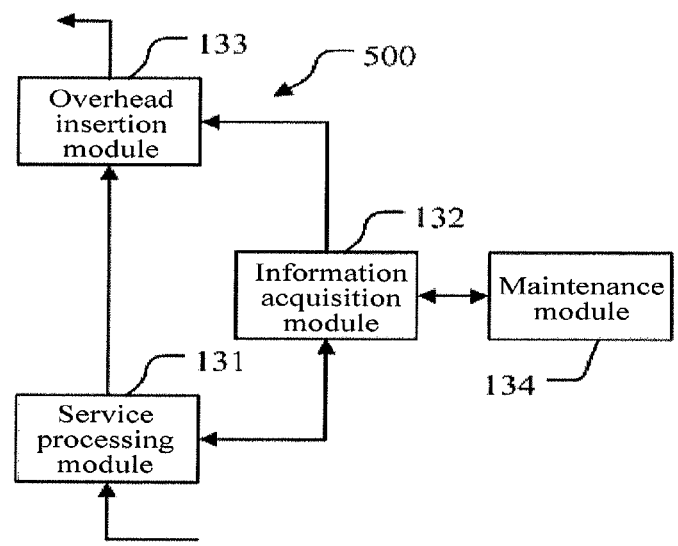
FIG. 18 is a schematic structural diagram of a first embodiment of an edge node provided by the present disclosure.

Referring to FIG. 18, FIG. 18 is a diagram of functional modules of a first embodiment of an edge node provided by the present disclosure. An edge node 500 implements a processing process and function of a client service in a sending direction, and includes a service processing module 131, an information acquisition module 132, an overhead insertion module 133 and a maintenance module 134.

The service processing module 131 is configured to recognize a type of a received client service, encapsulate a non-OTN service, generate an OTN signal frame or a lower order ODU, transmit the OTN signal frame or the lower order ODU to the overhead insertion module 133, and send a tag application to the information acquisition module 132 so as to acquire tag information and forwarding information of the OTN signal frame or those of the lower order ODU.

For example, when the client service processing module 131 determines that the client service is a time division multiplexing (TDM, time division multiplexing) service, if the TDM service is an OTN signal, the client service processing module 131 does not perform an encapsulation operation, and directly transmits the OTN signal to the overhead insertion module 133; if the TDM service is not an OTN signal, for example, the TDM service is a synchronous digital hierarchy (SDH, synchronous digital hierarchy) signal, the service processing module 131 encapsulates the TDM service, generates an OTN signal frame or a lower order ODU, and transmits the OTN signal frame or the lower order ODU to the overhead insertion module 133.

When determining that the client service is an IP service, the service processing module 131 analyzes a packet header of the IP service, and according to a forwarding equivalence class (FEC, forwarding equivalence class) rule, sends the IP packet to a corresponding IP packet queue, encapsulates the IP packet queue, generates an OTN signal frame or a lower order ODU, and transmits the OTN signal frame or the lower order ODU to the overhead insertion module 133.

The forwarding equivalence class (FEC) is a term in an MPLS technology, and refers to a group of service packets processed in the same manner in a service transmission process. Same MPLS labels are allocated to the services in the service packet. The forwarding equivalence class (FEC) may be identified as a destination address prefix, a virtual private network (VPN, virtual private network), or a traffic engineering tunnel.

In this embodiment, in order to apply an MPLS switching protocol to the optical transport network (OTN), a concept of the forwarding equivalence class (FEC) is introduced. It should be noted that, the IP service may also be classified according to other classification rules.

The information acquisition module 132 is configured to send a querying request to the maintenance module 134 according to the tag application, acquire the tag information and the forwarding information of the OTN signal frame or those of the lower order ODU, and transmit the tag information and the forwarding information to the overhead insertion module 133.

In an embodiment of adopting an IP forwarding protocol, the tag information includes an IP address and an MAC address. In an embodiment of adopting an MPLS switching protocol, the tag information is an MPLS label.

The maintenance module 134 is configured to establish and maintain a tag forwarding base, acquire the forwarding information from the tag forwarding base in response to the querying request, allocate the tag information of the OTN signal frame or the lower order ODU, and return the forwarding information and the tag information to the information acquisition module 132.

The tag forwarding base is similar to a routing base, and maintains a mirror image of the forwarding information of the service. For example, the tag forwarding base, based on information in the routing base, maintains address information of a next network segment. When a routing or topology structure in the network changes, the tag forwarding base is updated.

The tag forwarding base may be a forward information base (FIB, Forward information base) in an IP forwarding technology, or a label forwarding information base (LFIB, label forwarding information base) in an MPLS switching technology.

The overhead insertion module 133 is configured to insert the tag information into an overhead of a corresponding OTN signal frame, and forward the OTN signal frame according to the forwarding information. In the embodiment of adopting the IP forwarding protocol, the tag information includes an IP address and an MAC address. In the embodiment of adopting the MPLS switching protocol, the tag information is an MPLS label.

The tag forwarding base in the foregoing embodiment may be configured in advance, and may also be generated according to related information such as a routing protocol, and a label publishing protocol. In an embodiment of an edge node 700 shown in FIG. 19, the tag forwarding base is generated according to related information such as a routing protocol, and a label publishing protocol.

Figure 19:
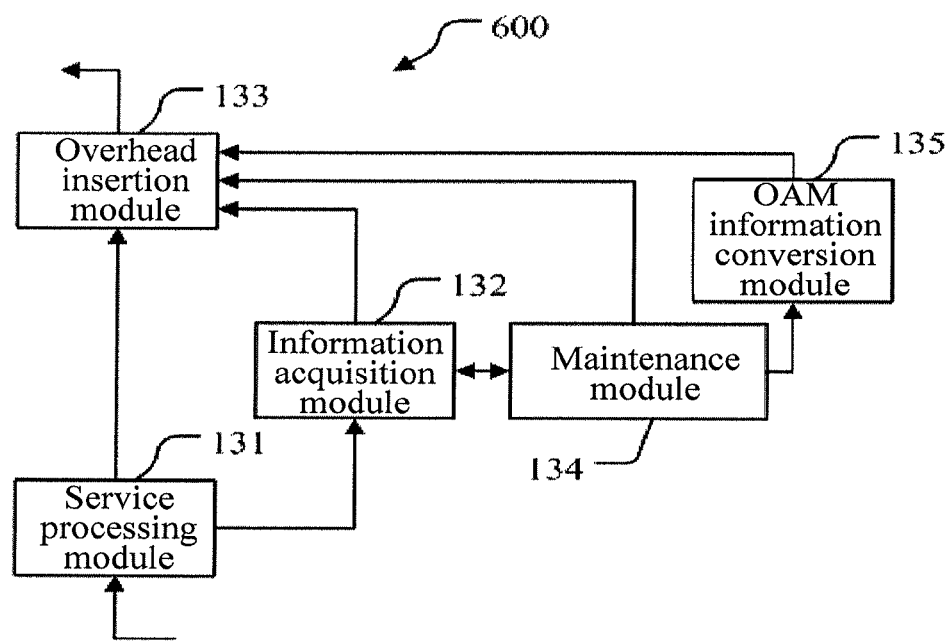
FIG. 19 is a schematic structural diagram of a second embodiment of an edge node provided by the present disclosure.

Referring to FIG. 19, FIG. 19 is a diagram of functional modules of a second embodiment of an edge node provided by the present disclosure. An edge node 600 implements a processing process and function of a client service in a sending direction, and is different from the edge node 500 in further including an OAM information conversion module 135.

A service processing module 131 is configured to recognize a type of a received client service, encapsulate a non-OTN service, generate an OTN signal frame or a lower order ODU, transmit the OTN signal frame or the lower order ODU to an overhead insertion module 133, and send a tag application to an information acquisition module 132 so as to acquire tag information and forwarding information of the OTN signal frame or those of the lower order ODU.

The information acquisition module 132 is configured to send a querying request to a maintenance module 134 according to the tag application, acquire the tag information and the forwarding information of the OTN signal frame or the lower order ODU, and transmit the tag information and the forwarding information to the overhead insertion module 133.

The maintenance module 134 is configured to establish and maintain a tag forwarding base, acquire corresponding forwarding information from the tag forwarding base in response to the querying request, allocate the tag information of the OTN signal frame or the lower order ODU, and return the forwarding information and the tag information to the information acquisition module 132.

In an embodiment of adopting an IP forwarding protocol, a routing information base (RIB, routing information base) is generated according to a signaling packet related to a routing protocol and OAM information of a link layer, and a forward information base (FIB, forward information base) is generated according to the routing information base (RIB).

In an embodiment of adopting an MPLS switching protocol, a routing information base (RIB) is generated according to a signaling packet related to the routing protocol and OAM information of a link layer, and a label forwarding information base (LFIB) is generated according to the routing information base (RIB), a signaling packet related to a label distribution protocol (LDP, label distribution protocol), and the OAM information of the link layer.

The maintenance module 134 is further configured to generate a signaling packet and OAM information of a link layer, transmit the signaling packet to the overhead insertion module 133, and transmit the OAM information of the link layer to the OAM information conversion module 135.

The OAM information conversion module 135 is configured to receive the OAM information of the link layer transmitted by the maintenance module 134, convert the OAM information of the link layer into OAM information of an OTN layer, and transmit the OAM information of the OTN layer to the overhead insertion module 133.

The overhead insertion module 133 inserts the received tag information, signaling packet and OAM information of the OTN layer into an overhead of the corresponding OTN signal frame or lower order ODU, generates a new OTN signal frame, and transmits the new OTN signal frame to a downstream intermediate node according to the forwarding information.

Figure 20:
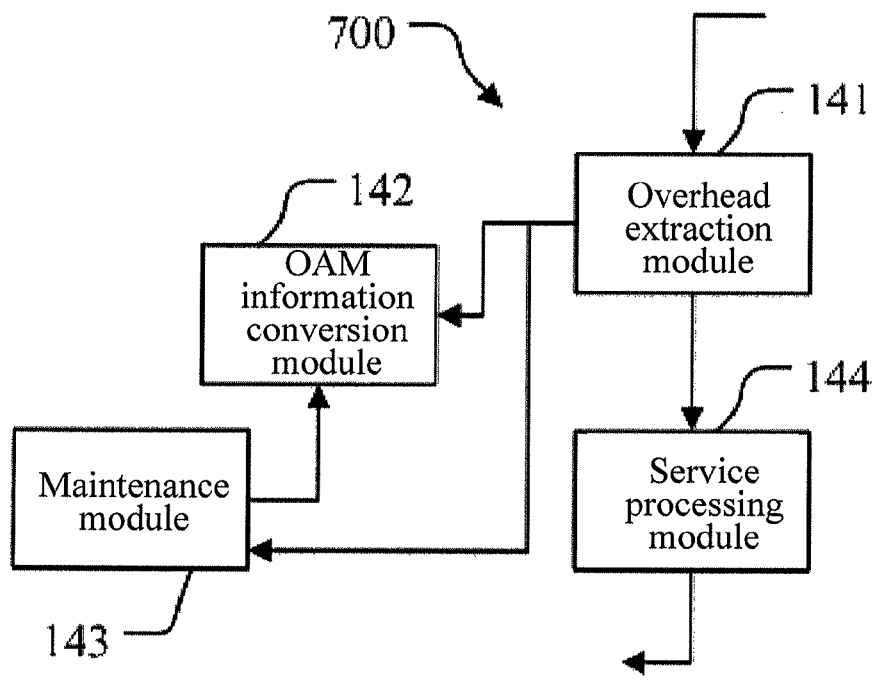
FIG. 20 is a schematic structural diagram of a third embodiment of an edge node provided by the present disclosure.

Referring to FIG. 20, FIG. 20 is a diagram of functional modules of a third embodiment of an edge node provided by the present disclosure. An edge node 700 implements a processing process and function of a client service in a sending direction, and includes an overhead extraction module 141, an OAM information conversion module 142, a maintenance module 143 and a service processing module 144.

The overhead extraction module 141 is configured to receive an OTN signal frame transmitted by an intermediate node, extract a signaling packet and OAM information of an OTN layer from an overhead of the OTN signal frame, transmit the OAM information of the OTN layer to the OAM information conversion module 142, and transmit the signaling packet to the maintenance module 143.

The OAM information conversion module 142 is configured to receive the OAM information of the OTN layer transmitted by the overhead extraction module 141, convert the OAM information of the OTN layer into OAM information of a link layer, and transmit the OAM information of the link layer to the maintenance module 143.

The maintenance module 143 is configured to receive the signaling packet transmitted by the overhead extraction module 141 and the OAM information of the link layer transmitted by the OAM information conversion module 142, update a tag forwarding base according to the signaling packet and the OAM information of the link layer, and provide the tag forwarding base for the edge node 600 to use when the edge node 600 processes the client service in a sending direction.

The service processing module 144 is configured to extract, from the OTN signal frame, a service carried in the OTN signal frame, and send the service to a client device.

In this embodiment, the tag forwarding base may be configured in advance, and may also be generated according to related information such as a routing protocol, and a label publishing protocol. If the tag forwarding base is configured in advance, the edge node does not need to include the overhead extraction module 141, the OAM information conversion module 142 or the maintenance module 143.

Figure 21:
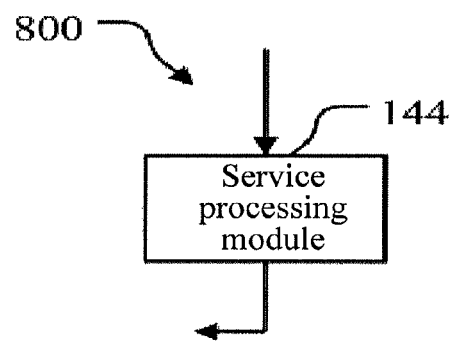
FIG. 21 is a schematic structural diagram of a fourth embodiment of an edge node provided by the present disclosure.

As shown in FIG. 21, FIG. 21 is a diagram of functional modules of a fourth embodiment of an edge node provided by the present disclosure. An edge node 800 includes a service processing module 144. The service processing module 144 is configured to receive an OTN signal frame from an intermediate node 500, and extract, from the OTN signal frame, a service carried in the OTN signal frame, and send the service to a client device.

Figure 22:
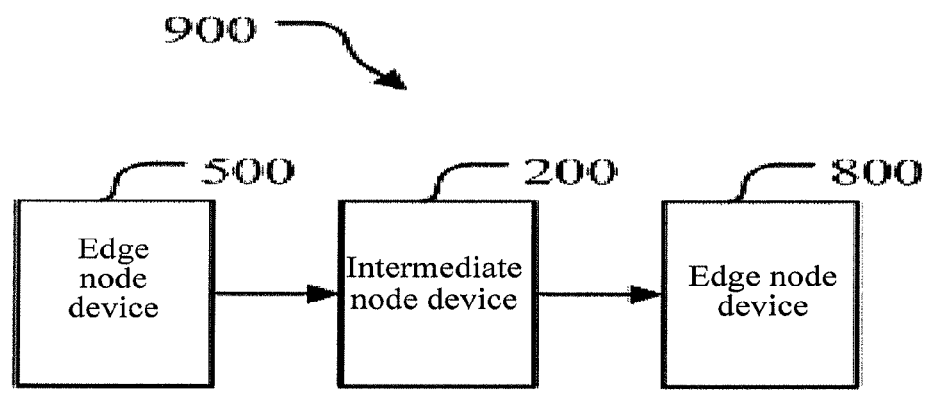
FIG. 22 is a schematic diagram of a first embodiment of an architecture of a service transmission system provided by the present disclosure.

As shown in FIG. 22, an embodiment of the present disclosure further provides a service transmission system 900. The system 900 is formed by an edge node 500 and an intermediate node 200, and may further include an edge node 800, which is capable of implementing forwarding and transmission of a client service in a bearer network.

Figure 23:
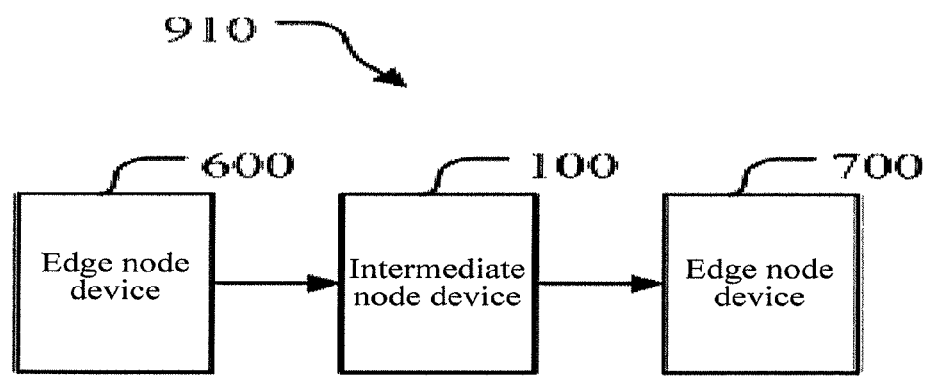
FIG. 23 is a schematic diagram of a second embodiment of an architecture of a service transmission system provided by the present disclosure.

As shown in FIG. 23, an embodiment of the present disclosure further provides a service transmission system 910. The system 910 is formed by an edge node 600 and an intermediate node 100, and may further include an edge node 700, which is capable of implementing forwarding and transmission of a client service in a bearer network.

Figure 24:
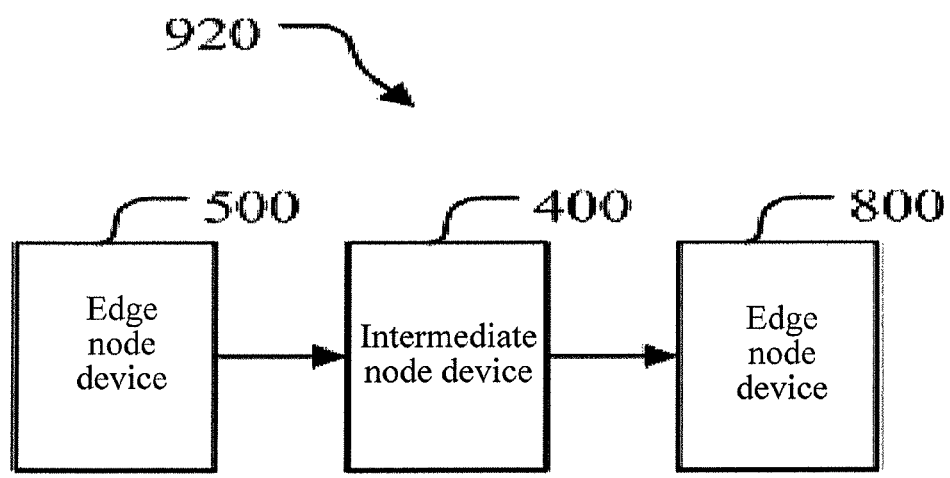
FIG. 24 is a schematic diagram of a third embodiment of an architecture of a service transmission system provided by the present disclosure.

As shown in FIG. 24, an embodiment of the present disclosure further provides a service transmission system 920. The system 920 is formed by an edge node 500 and an intermediate node 400, and may further include an edge node 800, which is capable of implementing forwarding and transmission of a client service in a bearer network.

Figure 25:
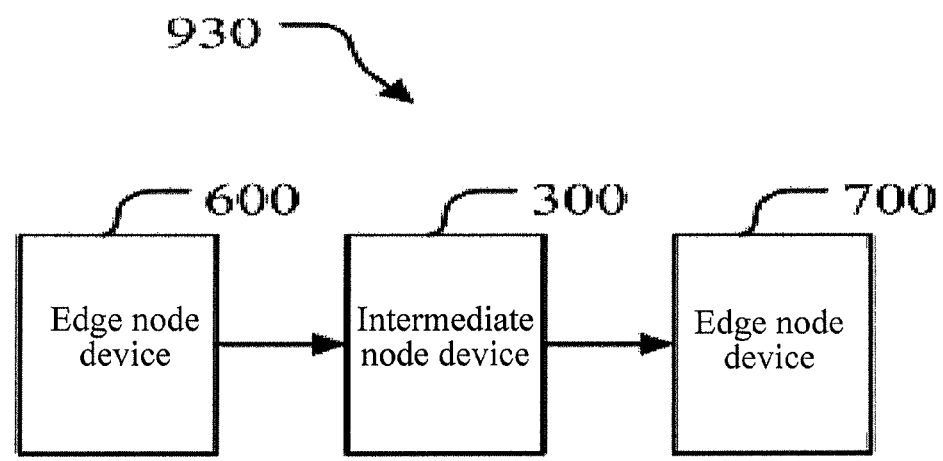
FIG. 25 is a schematic diagram of a fourth embodiment of an architecture of a service transmission system provided by the present disclosure.

As shown in FIG. 25, an embodiment of the present disclosure further provides a service transmission system 930. The system 930 is formed by an edge node 600 and an intermediate node 300, and may further include an edge node 700, which is capable of implementing forwarding and transmission of a client service in a bearer network.

All or a part of processes in the method according to the embodiments may be accomplished by relevant hardware under instructions of a computer program. The program may be stored in a computer-readable storage medium. When the program is executed, the process of the method according to the embodiments of the present disclosure is performed. The storage medium may be a magnetic disk, an optical disk, a read only memory (ROM, read only memory) or a random access memory (RAM, random access memory), and the like.

Exemplary embodiments of the present disclosure are described above. It should be noted that, improvements and modifications may be made by persons skilled in the art without departing from the principles of the present disclosure, and the improvements and modifications shall be construed as falling within the protection scope of the present disclosure.

What is claimed is:

1. A service transmission method, comprising:
receiving, by an intermediate node, an optical transport network (OTN) signal frame from an upstream edge node, the OTN signal frame comprising optically encoded overhead data and payload data;
extracting, by the intermediate node, tag information from the overhead data of the OTN signal frame, the tag information conforming to a multiprotocol label switching (MPLS) format that defines a label that identifies a path between the upstream edge node and a downstream edge node;

querying, by the intermediate node, a tag forwarding base according to the tag information to acquire forwarding information of the OTN signal frame, the forwarding information defining a next node on the path after the intermediate node; and forwarding, by the intermediate node, the OTN signal frame to the next on the path towards the downstream edge node according to the forwarding information.

2. The method according to claim 1, wherein forwarding the OTN signal frame according to the forwarding information further comprises:

demultiplexing a lower order optical channel data unit (ODU) from the OTN signal frame, and forwarding the lower order ODU according to the forwarding information.

3. The method according to claim 1, further comprising:

acquiring new tag information according to the forwarding information; and inserting the new tag information into an overhead of the forwarded OTN signal frame or lower order ODU to generate a new OTN signal frame, and transmitting the new OTN signal frame to the downstream node.

4. The method according to claim 3, further comprising:

when an Internet protocol (IP) forwarding protocol is adopted, acquiring a new media access control (MAC) address according to the forwarding information, replacing an original MAC address in the tag information with the new MAC address, and generating new tag information; and when a multiprotocol label switching (MPLS) protocol is adopted, extracting the new tag information from the forwarding information.

5. The method according to claim 1, further comprising:

extracting a signaling packet and operation, administration and maintenance (OAM) information of an OTN layer from an overhead of the OTN signal frame or the lower order ODU;

converting the OAM information of the OTN layer into OAM information of a link layer; and establishing or updating the tag forwarding base according to the signaling packet and the OAM information of the link layer.

6. The method according to claim 1, wherein the tag information is recorded in a tandem connection monitoring (TCM) field of the overhead of the OTN signal frame or the lower order ODU.

7. The method according to claim 5, further comprising:

generating a new signaling packet;

generating new OAM information of a link layer, and converting the new OAM information of the link layer into new OAM information of an OTN layer; and inserting the new signaling packet and the new OAM information of the OTN layer into the overhead of the forwarded OTN signal frame, generating a new OTN signal frame, and sending the new OTN signal frame to the downstream node.

8. The method according to any of claim 5, wherein the signaling packet is recorded in a general communication channel (GCC) field of the overhead of the OTN signal frame.

9. A service transmission method, comprising:

recognizing, by an intermediate node, a type of client service received from an edge node;

encapsulating, by the intermediate node, a non-optical transport network (OTN) service;

generating, by the intermediate node, an OTN signal frame or a lower order optical channel data unit (ODU);

querying, by the intermediate node, a tag forwarding base to acquire forwarding information of the OTN signal frame or the lower order ODU;

acquiring, by the intermediate node, tag information, and inserting the tag information into an overhead of the OTN signal frame or the lower order ODU, the tag information conforming to a multiprotocol label switching (MPLS) format that defines a label that identifies a path between the edge node and a downstream edge node; and forwarding, by the intermediate node, the OTN signal frame according to the forwarding information to a different edge node that is after the intermediate node on the path.

10. The method according to claim 9, further comprising:

generating a signaling packet;

generating operation, administration and maintenance (OAM) information of a link layer, and converting the OAM information of the link layer into OAM information of an OTN layer; and inserting the signaling packet and the OAM information of the OTN layer into an overhead of the forwarded OTN frame, generating a new OTN signal frame, and sending the new OTN signal frame to a downstream node.

11. The method according to claim 9, further comprising:

receiving the OTN signal frame transmitted by the intermediate node; and extracting, from the OTN signal frame, a service carried in the OTN signal frame, and sending the service to a client device.

12. The method according to claim 11, further comprising:

extracting a signaling packet from an overhead of the OTN signal frame;

extracting OAM information of an OTN layer from the overhead of the OTN signal frame, and converting the OAM information of the OTN layer into OAM information of a link layer; and updating the tag forwarding base according to the signaling packet and the OAM information of the link layer.

13. An intermediate node device, comprising an overhead extraction module, an information acquisition module, a forwarding module and a maintenance module, wherein:

the overhead extraction module is configured to receive an OTN signal frame from an upstream edge node, and extract tag information from an overhead of the OTN signal frame, the tag information conforming to a multiprotocol label switching (MPLS) format that defines a label that identifies a path between the upstream edge node and a downstream edge node;

the information acquisition module is configured to send a querying request to the maintenance module according to the tag information, acquire forwarding information of the OTN signal frame, and transmit the forwarding information to the forwarding module, wherein the forwarding information defines a next node on the path after the intermediate node;

the maintenance module is configured to establish and maintain a tag forwarding base, and acquire the forwarding information from the tag forwarding base according to the querying request; and the forwarding module is configured to forward the OTN signal frame according to the forwarding information to the next node on the path towards the downstream edge node.

14. The node device according to claim 13, further comprising an overhead insertion module, wherein the information acquisition module is further configured to acquire new tag information according to the forwarding information, and transmit the new tag information to the overhead insertion module; and the overhead insertion module is configured to receive the OTN signal frame forwarded by the forwarding module, insert the new tag information into the overhead of the OTN signal frame, generate a new OTN signal frame, and transmit the new OTN signal frame to a downstream node.

15. The node device according to claim 13, further comprising an operation, administration and maintenance (OAM) information conversion module, wherein the overhead extraction module is further configured to extract the signaling packet and OAM information of an OTN layer —from the overhead of the OTN signal frame, transmit the OAM information of the OTN layer to the OAM information conversion module, and transmit the signaling packet to the maintenance module;

the OAM information conversion module is configured to convert the OAM information of the OTN layer into OAM information of a link layer, and transmit the OAM information of the link layer to the maintenance module; and the maintenance module is further configured to establish the tag forwarding base according to the signaling packet and the OAM information of the link layer.

16. The node device according to claim 15, further comprising an overhead insertion module, wherein the information acquisition module is further configured to acquire new tag information according to the forwarding information, and transmit the new tag information to the overhead insertion module;

the maintenance module is further configured to generate a new signaling packet and new OAM information of a link layer, transmit the new signaling packet to the overhead insertion module, and transmit the new OAM information of a link layer to the OAM information conversion module;

the OAM information conversion module is configured to convert the new OAM information of a link layer into OAM information of an OTN layer, and transmit the new OAM information of a link layer to the overhead insertion module; and the overhead insertion module is configured to receive the OTN signal frame forwarded by the forwarding module, insert the new tag information, the new signaling packet, and the new OAM information of a link layer into the overhead of the OTN signal frame, generate a new OTN signal frame, and transmit the new OTN signal frame to the downstream node.

17. The node device according to claim 15, wherein, when an Internet protocol (IP) forwarding protocol is adopted, the information acquisition module generates a new media access control (MAC) address according to the forwarding information, replaces an original MAC address in the tag information with the new MAC address, and generates new tag information; and when a multiprotocol label switching (MPLS) protocol is adopted, the information acquisition module extracts the new tag information from the forwarding information.

18. The node device according to claim 13, further comprising an ODU demultiplexing module and an ODU multiplexing module, wherein the ODU demultiplexing module demultiplexes a lower order ODU from the OTN signal frame outputted by the overhead extraction module;

the forwarding module forwards the lower order ODU according to the forwarding information; and the ODU multiplexing module multiplexes the forwarded lower order ODU into a higher order ODU.

19. The node device according to claim 13, wherein the tag information is recorded in a tandem connection monitoring (TCM) field of the overhead of the OTN signal frame.

20. The node device according to claim 15, wherein the signaling packet is recorded in a general communication channel (GCC) field of the overhead of the OTN signal frame.

21. An intermediate node device, wherein the intermediate node device comprises a service processing module, an information acquisition module, an overhead insertion module and a maintenance module, wherein: the service processing module is configured to recognize a type of client service received from an edge node, encapsulate a non-OTN service, generate an OTN signal frame or a lower order ODU, transmit the OTN signal frame or the lower order ODU to the overhead insertion module, and send a tag application to the information acquisition module, so as to acquire tag information and forwarding information of the OTN signal frame or those of the lower order ODU, wherein the tag information conforms to a multiprotocol label switching (MPLS) format that defines a label that identifies a path between the edge node and a downstream edge node;

the information acquisition module is configured to send a querying request to the maintenance module according to the tag application, acquire the tag information and the forwarding information of the OTN signal frame or those of the lower order ODU, and transmit the tag information and the forwarding information to the overhead insertion module;

the maintenance module is configured to establish and maintain a tag forwarding base, acquire the forwarding information from the tag forwarding base in response to the querying request, allocate the tag information of the OTN signal frame or the lower order ODU, and return the forwarding information and the tag information to the information acquisition module; and the overhead insertion module is configured to insert the tag information into an overhead of a corresponding OTN signal frame or lower order ODU, and forward the OTN signal frame or the lower order ODU according to the forwarding information to a different edge node that is after the intermediate node device on the path.

22. The node device according to claim 21, further comprising an operation, administration and maintenance (OAM) information conversion module, wherein:

the maintenance module is further configured to generate a signaling packet and OAM information of a link layer, transmit the signaling packet to the overhead insertion module, and transmit the OAM information of the link layer to the OAM information conversion module;

the OAM information conversion module is configured to receive the OAM information of the link layer transmitted by the maintenance module, convert the OAM information of the link layer into OAM information of an OTN layer, and transmit the OAM information of the OTN layer to the overhead insertion module; and the overhead insertion module inserts the received tag information, signaling packet and OAM information of the OTN layer into an overhead of the corresponding OTN signal frame or lower order ODU, generates a new OTN signal frame, and transmits the new OTN signal frame to a downstream intermediate node according to the forwarding information.

23. The node device according to claim 21, wherein a service processing module is further configured to extract, from the OTN signal frame transmitted by the intermediate node, a service carried in the OTN signal frame and send the service to a client device.

24. The node device according to claim 21, further comprising an overhead extraction module, wherein:

the overhead extraction module is configured to receive the OTN signal frame transmitted by the intermediate node, extract the signaling packet and the OAM information of the OTN layer from the overhead of the OTN signal frame, transmit the OAM information of the OTN layer to the OAM information conversion module, and transmit the signaling packet to the maintenance module;

the OAM information conversion module is configured to receive the OAM information of the OTN layer transmitted by the overhead extraction module, convert the OAM information of the OTN layer into the OAM information of the link layer, and transmit the OAM information of the link layer to the maintenance module; and the maintenance module is configured to receive the signaling packet transmitted by the overhead extraction module and the OAM information of the link layer transmitted by the OAM information conversion module, and update the tag forwarding base according to the signaling packet and the OAM information of the link layer.

* * * * *